(12) United States Patent
Pickholz et al.

(10) Patent No.: US 12,297,970 B2
(45) Date of Patent: May 13, 2025

(54) DUAL AXIS ALIGNMENT FOR LED PRESCRIPTION OPTICS

(71) Applicant: MagWerks Vision Inc., Oxford, MI (US)

(72) Inventors: Michael F. Pickholz, Oxford, MI (US); Steven Francis Tregilgas, Oxford, MI (US)

(73) Assignee: MagWerks Vision Inc., Oxford, MI (US)

( * ) Notice: Subject to any disclaimer, the term of this patent is extended or adjusted under 35 U.S.C. 154(b) by 0 days.

(21) Appl. No.: 18/793,363

(22) Filed: Aug. 2, 2024

(65) Prior Publication Data

US 2024/0392940 A1 Nov. 28, 2024

Related U.S. Application Data

(63) Continuation of application No. 18/405,562, filed on Jan. 5, 2024, now Pat. No. 12,092,281, which is a continuation-in-part of application No. 17/894,668, filed on Aug. 24, 2022, now Pat. No. 11,913,616.

(60) Provisional application No. 63/236,342, filed on Aug. 24, 2021.

(51) Int. Cl.
*F21S 41/275* (2018.01)
*F21S 41/29* (2018.01)
*F21S 41/55* (2018.01)
*F21S 43/19* (2018.01)

(52) U.S. Cl.
CPC ............ *F21S 41/275* (2018.01); *F21S 41/29* (2018.01); *F21S 41/55* (2018.01); *F21S 43/19* (2018.01)

(58) Field of Classification Search
CPC ...... F21V 31/005; F21V 14/06; F21V 14/065; F21S 41/63; F21S 41/322; F21S 41/635; B60Q 1/0683
See application file for complete search history.

(56) References Cited

U.S. PATENT DOCUMENTS

| | | | |
|---|---|---|---|
| 4,930,367 A | 6/1990 | Nagasawa | |
| 5,813,743 A | 9/1998 | Naka | |
| 5,926,320 A | 7/1999 | Parkyn, Jr. et al. | |
| 6,234,655 B1 | 5/2001 | Suehiro et al. | |
| 11,378,245 B2 * | 7/2022 | Harada | F21V 17/12 |
| 2014/0009951 A1 | 1/2014 | Monma et al. | |
| 2014/0085919 A1 | 3/2014 | Tsai et al. | |
| 2015/0085511 A1 * | 3/2015 | Shibata | F21S 45/48 |
| | | | 362/512 |
| 2015/0184819 A1 * | 7/2015 | Maliar | F21S 41/26 |
| | | | 362/512 |

(Continued)

*Primary Examiner* — Eric T Eide
(74) *Attorney, Agent, or Firm* — Young Basile Hanlon & MacFarlane, P.C.

(57) ABSTRACT

A vehicle lamp is configured to mount directly to a vehicle component. The vehicle lamp includes a substrate, a lens, a compliant skirt made of silicone extending from a front perimeter of the lens and extending to the substrate, the compliant skirt configured to gaplessly fit within a vehicle aperture in the vehicle component and to attach to the vehicle component with the substrate, a reinforcing structure configured to provide strength to the vehicle lamp, the reinforcing structure connecting the lens to the substrate, and an adjustment mechanism extending through the reinforcing structure and the substrate and configured to move the lens about one or both of a vertical axis and a horizontal axis.

20 Claims, 28 Drawing Sheets

(56) References Cited

U.S. PATENT DOCUMENTS

| | | |
|---|---|---|
| 2015/0323148 A1 | 11/2015 | Tsuda |
| 2017/0370548 A1 | 12/2017 | Dinant et al. |
| 2018/0156423 A1* | 6/2018 | Murby .................. F21S 8/026 |
| 2019/0017692 A1 | 1/2019 | Dinant et al. |
| 2019/0092218 A1 | 3/2019 | Kouchi |

* cited by examiner

DUAL AXIS ALIGNMENT FOR LED PRESCRIPTION OPTICS

CROSS-REFERENCE TO RELATED APPLICATION(S)

This application is a continuation of U.S. patent application Ser. No. 18/405,562, filed on Jan. 5, 2024, which is a continuation-in-part of U.S. patent application Ser. No. 17/894,668, filed on Aug. 24, 2022, now U.S. Pat. No. 11,913,616 issued on Feb. 27, 2024, which claims priority to and the benefit of U.S. Provisional Patent Application Ser. No. 63/236,342, filed Aug. 24, 2021, the entire disclosures of which are hereby incorporated by reference.

TECHNICAL FIELD

This disclosure relates to the field of prescription optics used in lamps utilized for illumination or signalization in applications such as vehicle headlamps, tail lamps, signal lamps, etc. The prescription optics can be unitary structures made from optical silicone to be used with LEDs, or can be plastic, glass or other transparent material lenses that have a silicone or other elastomeric or flexible component attached, such as a skirt, through which the dual axis alignment takes place.

BACKGROUND

Optical lenses engineered to harness and direct light emitted from light sources are produced with basic techniques devised to tailor light output. Since the 1980's, plastic lenses have steadily replaced glass as the transparent outer enclosure for lighting applications in most fields. Historically, plastic lenses have been produced from rigid materials, such as, but not limited to, polycarbonate (PC), poly(methyl) methacrylate (PMMA), polystyrene (PS), cyclic olefin polymer (COP), cyclic olefin copolymer (COCP).

These materials are essentially rigid in nature, not substantially deforming under applied pressure or through the force of gravity. Once properly fixed and in place, such materials essentially retain their geometric configuration. However, there are many disadvantages to the use of plastic for optical lenses, particularly in the automotive field, given the propensity to deform or distort under heat, low abrasion resistance, making them prone to scratching, propensity to damage via UV (Ultraviolet) radiation, such as discoloration, amongst them. Furthermore, separate components (e.g., when utilizing reflector-type optical) can lead to additional disadvantages and low levels of efficiency. There is an ever-growing need for weather-proof, light-weight lamps for electric and autonomous vehicles that can meet the different prescription requirements of the various applications while also meeting government mandated specifications.

Another disadvantage of conventional plastic optical lenses is the requirement of an adjuster mechanism to align, effectively aim, the lamp(s) in order to compensate for variations on the vehicle attitude vis-à-vis the road. A conventional lamp is mounted on a vehicle, for example, using four bosses, with three external adjusters placed in appropriate positions on the lamp. These adjusters require mounting space, add weight to the lamp, and take time to properly align. They also require that each lamp be a distinct, separate unit as the alignment is tied to the lamp housing.

SUMMARY

Disclosed herein are embodiments of unitary optically clear prescription optics or lenses. One example of a unitary prescription optic as disclosed herein has a molded body comprising: a front surface configured as a light exit; an integral TIR (Total Internal Reflector) configured to receive and reflect light from a LED light source; and an integral attachment portion configured to mount the molded body within a housing. Unitary herein means a single, uniform molded body.

Also disclosed herein are lamps, such as for vehicles. One example of a lamp has a unitary molded optic or lens comprising: a front surface configured as a light exit; an integral reflector molded to meet a prescription light output; and an integral attachment portion. The lamp also includes an LED light source, the integral reflector receiving and reflecting light from the LED light source, and a housing configured to mount the unitary molded body within a structure, the integral attachment portion attached directly to the housing without an additional seal member.

Another example of a lamp with a single-stage optic has a unitary molded body molded from silicone comprising: a front surface configured as a light exit; an integral reflector molded to meet a prescription light output; and an integral attachment portion. The lamp further has a light source and a housing configured to mount the unitary molded body to a structure.

The unitary silicone prescription optics disclosed herein provide a single lens optic with integrally molded reflector, the optic molded from silicone and capable of complex prescriptions that meet the regulatory requirements for regulated lighting applications. The unitary silicone prescription optics provide a much lighter lamp beneficial to all vehicles, and particularly autonomous vehicles and electric vehicles. Because the optic is a single component, the optics can reach 85%+ efficiency, a significant increase over conventional lamps, which lose about 10% to 15% in light output for each optical component through which light passes, such as a typical external lamp cover lens. The unitary silicone prescription optics are particularly useful in LED applications as optical silicone has a significantly higher temperature resistance than conventional plastic lenses, thereby enabling the placing of the optic in very close proximity, even in contact with the LED(s) without distortion or deformation issues. Furthermore, optical silicone being effectively impervious to UV (Ultraviolet) radiation, the close proximity of the optical silicone lens to the LED light source does not carry the potential of material degradation, such as yellowing, which can negatively affect plastic materials. The disclosed prescription optics can be used without any coatings or outer lenses, as the silicone is effectively impervious to UV damage and damage from road debris impingement, although silicone coatings, which further enhance performance durability, are also available. The prescription optics disclosed herein can be mounted directly into the vehicle lamp housing, without the need for additional sealant or gaskets, as the silicone can also be configured as an effective seal. Because the optic is one piece, there is no alignment necessary between components when installed in the application.

Also disclosed is a lamp having a lens having a front light exiting surface, three alignment portions extending from at least three edge positions of the lens, a substrate opposite the front light exiting surface positioned in parallel to the three alignment portions with a flexible material between the substrate the three alignment portions, the substrate having three apertures aligned with the three alignment portions, and a dual axis adjustment mechanism. The dual axis adjustment mechanism includes: a fixed member fixedly connected to both the substrate and one of the three alignment portions and positioned on both a horizontal axis and a vertical axis of the lens; a vertical adjustor fixedly attached to a second of the three alignment portions and movable with respect to the substrate, the vertical adjustor positioned on the horizontal axis and configured to adjust the lens with respect to the vertical axis; and a horizontal adjustor fixedly attached to a third of the three alignment portions and movable with respect to the substrate, the horizontal adjustor positioned along the vertical axis and configured to adjust the lens with respect to the horizontal axis. A compliant skirt gaplessly frames a front surface of the lens where light exits, the compliant skirt extending to the substrate to enclose the lamp chamber.

Also disclosed is a vehicle lamp is configured to mount directly to a vehicle component. The vehicle lamp includes a substrate, a lens, a compliant skirt made of silicone extending from a front perimeter of the lens and extending to the substrate, the compliant skirt configured to gaplessly fit within a vehicle aperture in the vehicle component and to attach to the vehicle component with the substrate, a reinforcing structure configured to provide strength to the vehicle lamp, the reinforcing structure connecting the lens to the substrate, and an adjustment mechanism extending through the reinforcing structure and the substrate and configured to move the lens about one or both of a vertical axis and a horizontal axis.

These and other embodiments and aspects are contemplated herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
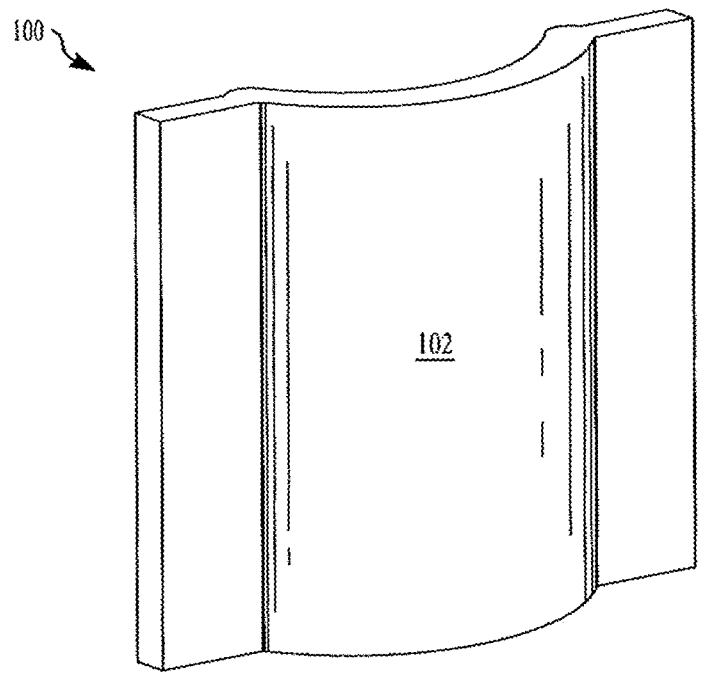
FIG. 1A is a front perspective view of a unitary silicone prescription optic as disclosed herein.

Conventional automotive lamps incorporate a light source, which may include a circuit board, a primary optic system, which can comprise a reflector and a separate lens, for example, along with a secondary optic, the components held in a housing, which includes an outer lens in order to achieve a generally fluidly isolated system. Additional lenses may also be included in the primary optic, such as a collimating lens, in certain applications, such as fog lamps. Reflectors are typically made of various plastics, via plastic injection molding, metal castings or stamped metal construction. Outer lenses of the secondary optic were typically glass, but have evolved to plastics, such as PC, PMMA, PS, COP and COCP, as examples. Where glass is both weather and UV resistant, plastics are generally not. Thus, plastic outer lenses typically require a UV coating to protect against deterioration from sunlight, as well as a hard coating to protect against damage from impinging road debris. To further protect the lamp from weather, gaskets and/or sealants are necessary to properly seal the lamp at least between the outer lens and the housing.

These conventional lamps require the multi-stage optics to properly collect, then shape the light into the desired illumination pattern. As light passes through multiple components, efficiency is lost. On average, about 10% to 15% efficiency is lost as it is reflected or passes through each successive medium. Current conventional automotive lamp efficiency for reflector-type optical systems hovers around 40% or less, which entails a major proportion of the LED's light output is thus lost.

Disclosed herein are embodiments of a single-stage optic used with a light source and a housing to provide a lamp that is lightweight, has fewer components, is water-tight and UV resistant, among other benefits. The unitary silicone prescription optics disclosed herein have a molded silicone body comprising: a front surface configured as a light exit; an integral reflector configured to receive and reflect light from an LED light source; and integral attachment portions configured to mount within a housing. As used herein "prescription" refers to an optic or a lens that is designed to meet certain specifications with regard to light or radiation pattern and intensity for a particular use of the optic.

The unitary silicone prescription optics disclosed herein will be understood by those skilled in the art to have utility in numerous, various applications, including those applications having regulated specifications and those that do not. Applications having regulated specifications, such as by a government or government agency, for which the disclosed optics are particularly suited, include, without limitation, electric and motor vehicles (including automobiles, trucks, aircraft, watercraft, recreational vehicles, off-road vehicles, and the like), aerospace, and other lighting. Vehicle applications include, but are not limited to, headlamps and taillamps. Headlamps and taillamps herein include turn signal lamps, low beam lamps, high beam lamps, signal lamps, side lighting lamps, auxiliary lamps, tail lamps, marker lights, position lights, stop lights, brake lights and fog lamps. The term "exterior vehicle lamp" used herein generally refers to those listed as well as others known and used in the industry. The unitary silicone prescription optics may also be used in other industries and may be used with non-visible illumination features such as LiDAR emitters, infrared emitters, RADAR emitters, LiFi (information/data transmission employing light beams.

Optical silicone provides many advantages over the rigid plastic typically used in lenses. Common headlamp plastic lenses, such as those produced from PC (polycarbonate) require the additional application of external anti-UV coatings in order to preclude the degradation of the plastic, which otherwise rapidly turns opaque, greatly reducing the functional performance as well as adversely impacting the appearance of the product. Such products commonly have a limited performance lifespan, leading to often severe optical degradation with extended sunlight (UV) exposure, a clear negative for products frequently or continually exposed to sun. Optical silicone is impervious to UV radiation damage. Optical silicone testing has demonstrated resistance to UV damage in excess of 10 years in direct sun exposure. No anti-UV coating is needed with optical silicone.

Conventional plastic lenses, particularly those used on vehicle headlamps, also require hard coatings in order to mitigate the rapid surface degradation brought about by foreign object impingement, occurring, for example, during travel. Optical silicone has an inherent resistance to gravel and other road debris impingement. The soft, rubber-like properties of optical silicone are such that, rather than imbedding and/or damaging the surface of the plastic lenses, the energy is absorbed within the optical silicone without adversely affecting the optical clarity of the material, with the debris simply bouncing-off without imparting physical damage to the optic silicone material.

Plastics used to make lenses shrink while cooling, which leads to the loss of critical optical shape definition as the material pulls away from the desired tool optical geometry. This can be particularly pronounced in large molds, with large optical lens volumes leading to undesirable deformations in other critical optic areas. The industry has sought to address such issues via multi-step molding solutions, whereby lenses are produced via successive molding "steps" thereby accumulating material in subsequent molding operations so as to control shrink and thereby deliver accurate as-molded optical performance. Such processes are inherently expensive, given the multi-step nature of the molding equipment.

Optical silicone can be molded/formed accurately in a large format optic with minimal sink or other optical aberrations and in a single step molding process. Optical silicone optics are formed via a chemical reaction process, which commonly utilizes base resin mixed with a catalyst on a typical 50/50 ratio. Heat is added to the process in order to expedite the chemical reaction and accelerate the curing process. Given the minimal, highly controllable material shrink rate vs. the significantly greater degree associated with thermoplastics, a far greater accuracy in the replication of the optical surface is achieved, all in a single molding step. Such properties are critically important in achieving sharp, knife-edged optical elements, which otherwise become less accurate, more rounded and less defined when utilizing plastics, thereby introducing unwanted optical inaccuracies. Optical silicone is rubber-like in nature. The flexibility of optical silicone provides the ability to incorporate flexible elements, the ability to incorporate significant "undercuts", which otherwise would prevent plastics to be removed from the mold without incorporating mold action, and the ability to significantly deform yet return to its as-molded shape. A significant trait of silicone is its high degree of elasticity and "memory", thereby enabling a high degree of distortion yet, allowing a return to its original, as molded geometry, once the external applied forces are removed. This is stark contrast to the rigid nature of plastics as well as glass optical elements.

In the case of glass, while knife-edge features are manufacturable, these nevertheless are by nature extremely brittle, prone to damage whether from handling, impact or vibration. Any such damage immediately introduces highly negative optical impacts making the use of glass materials impractical for sharp-edge configurations. Conversely, optical silicone materials can achieve very sharp, highly-defined optical surfaces, which are effectively impervious to handling, vibration and even light impact. Light impact being, once again, readily absorbed, with the intrinsic material memory insuring the return to the original geometry, thereby preserving the optical function under adverse, even extreme functional duties.

Yet another advantage of using optical silicone is its significantly higher temperature resistance than other common optical-grade plastics, which make optical silicone particularly useful in LED applications where close proximity between the optical element and the LED source is functionally advantageous. Such close proximity between LEDs and conventional plastic lenses is often precluded due to the thermal degradation brought about by high temperatures on plastic optics, for instance. Conventional clear plastics are only temperature resistant up to around 100° C. For example, PC begins to experience deformation by 120° C. and PMMA is temperature resistant only up to about 90° C. Silicones are usually rated to remain thermally stable to temperatures in the area of 200° C., which is nearly double that of traditional optical grade plastics. High-power LEDs, such as those developed for automotive headlamp applications usually exhibit an exterior surface temperature of approximately 135° C., well above the softening temperature of optical PC materials. As such care must be taken to position plastic optical components sufficiently distant from the LED light sources so as to preclude deformation, even melting. Silicone optics can thus be placed near or directly over high temperature LED sources, thereby significantly improving optical performance while precluding damage over time, a critical functional advantage. Of course, the unitary silicone prescription optics can also be used with incandescent lights, halogen lights, high intensity discharge/xenon lights and projection units.

Another optical silicone advantage relates to the aforementioned tendency of PC to deteriorate under the presence of UV radiation, which most LEDs emit, even to a low extent. Over time such UV radiations can thus negatively affect the color and transmission capabilities of PC, as well as other optically clear plastic materials, thereby introducing yet additional design issues, which negatively affect optical performance, both on a short as well as long-term basis. Optical silicone allows UV radiation to pass through, thereby not affecting the molecular composition and/or properties of the material over time.

The ability to combine the outer lens, some or all of any additional optical elements, and the reflector into a unitary body, providing full optical management, also provides many advantages. The silicone optics do not need additional lenses for protection or further light refraction and can be directly exposed to atmosphere.

Figure 1B:
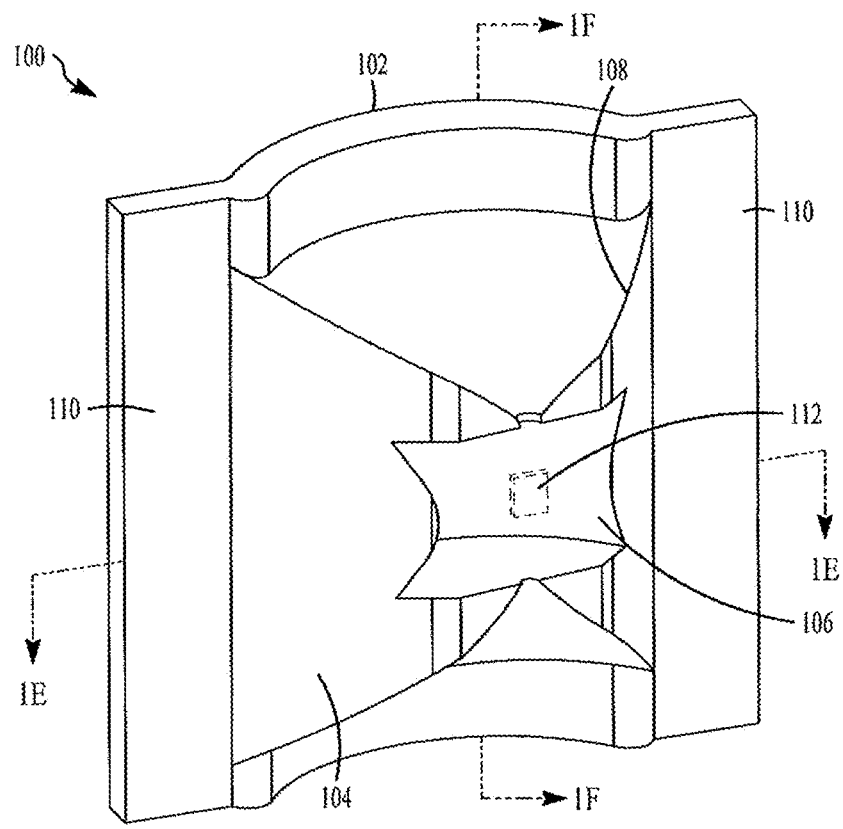
FIG. 1B is a rear perspective view of the unitary silicone prescription optic in FIG. 1A.
Figure 1C:
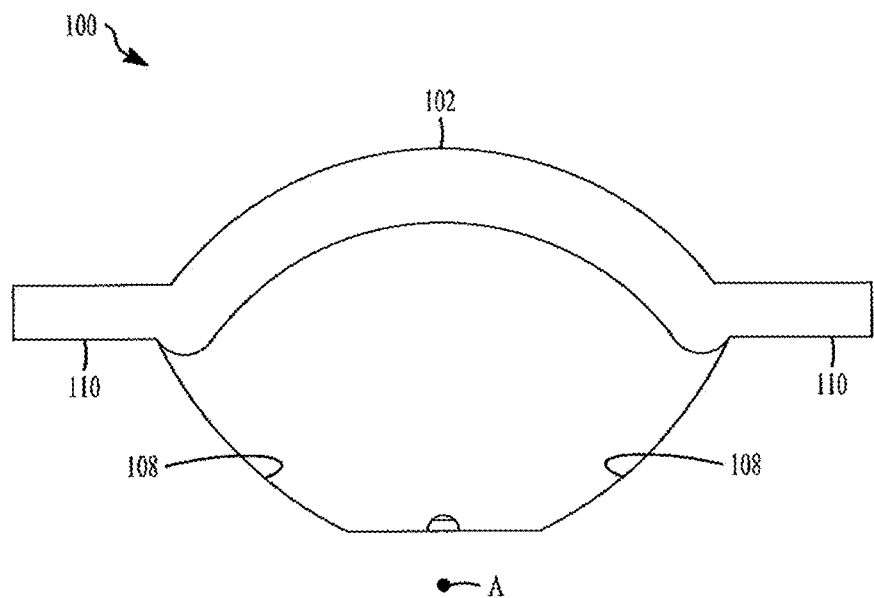
FIG. 1C is a top plan view of the unitary silicone prescription optic in FIG. 1A.
Figure 2:
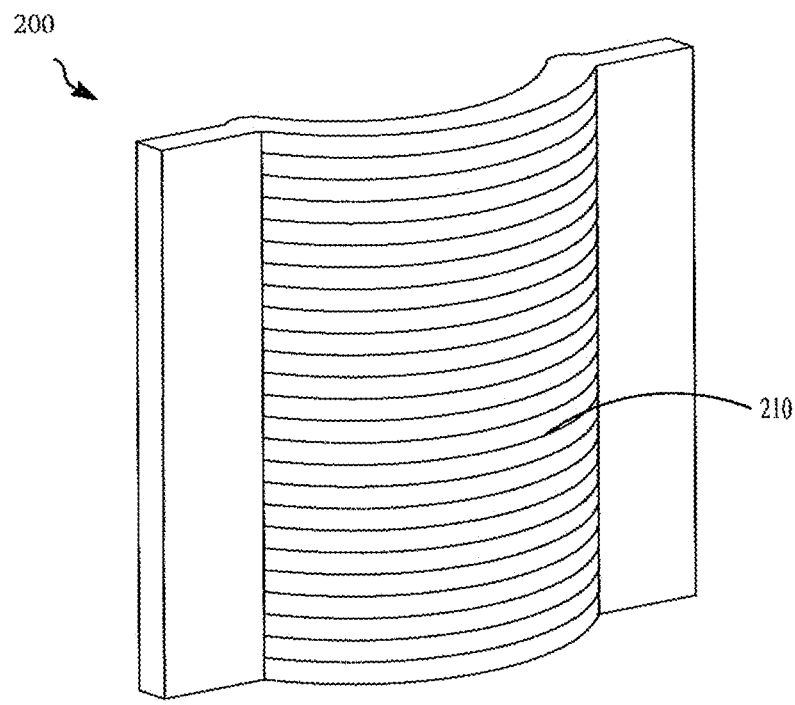
FIG. 2 is a front perspective view of another aspect of a unitary silicone prescription optic as disclosed herein.

FIG. 1A is a front perspective view of an embodiment of a single-stage optic or lens for a lamp, or a unitary silicone prescription optic 100, and FIG. 1B is a rear perspective view of FIG. 1A. The front surface 102 is an exit surface through which light exits the optic. The front surface 102 can be smooth, can have vertical or horizontal flutes, such as the horizontal flutes 210 illustrated with the unitary silicone prescription optic of FIG. 2. The front surface 102 may have pillows, or other contours that are necessary to provide the requisite light dispersion pattern and/or intensity. The flutes, pillows or other optical features are molded into the front surface 102 as the prescription optic 100 is molded. The front surface 102 is designed to meet the prescription and specifications for which it will be used. The front surface 102 is generally coating-free in use else the applications of coatings, which further enhance the already high functionality of optical silicone via the further enhancement of chemical resistance, surface toughness and the like. No coating for UV protection or damage protection is generally required as the silicone material is UV resistant and generally resistant to damage from impinging debris.

Figure 1D:
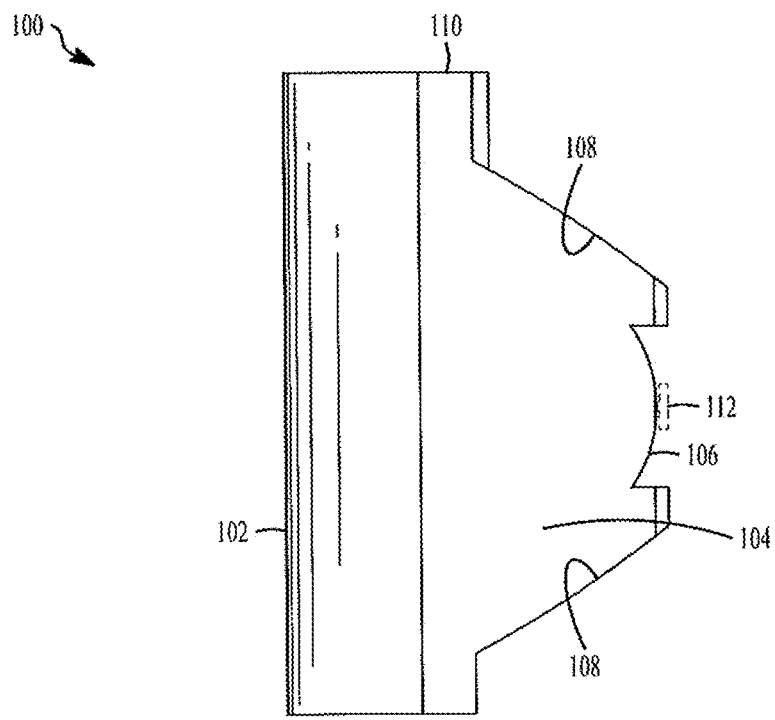
FIG. 1D is a right-side view of the unitary silicone prescription optic in FIG. 1A.
Figure 1E:
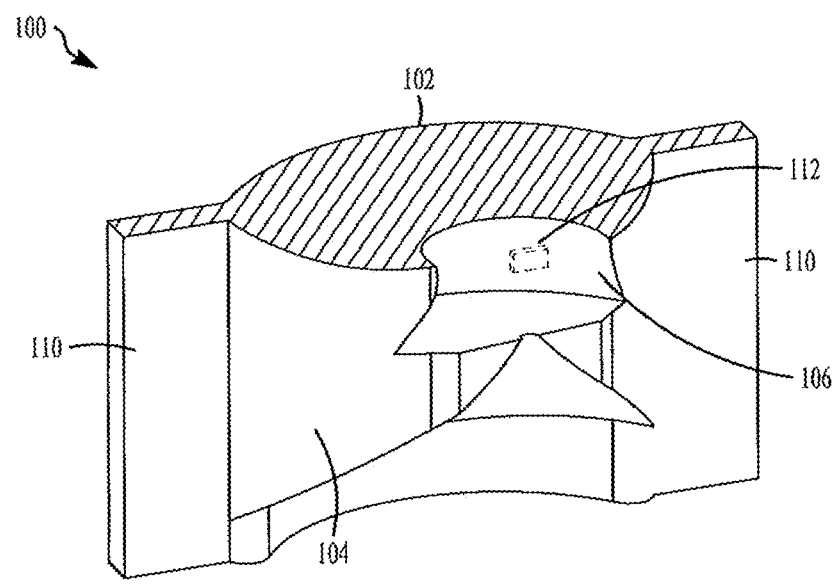
FIG. 1E is a rear perspective view of a cross-sectional view of the unitary silicone prescription optic in FIG. 1A along line E.
Figure 1F:
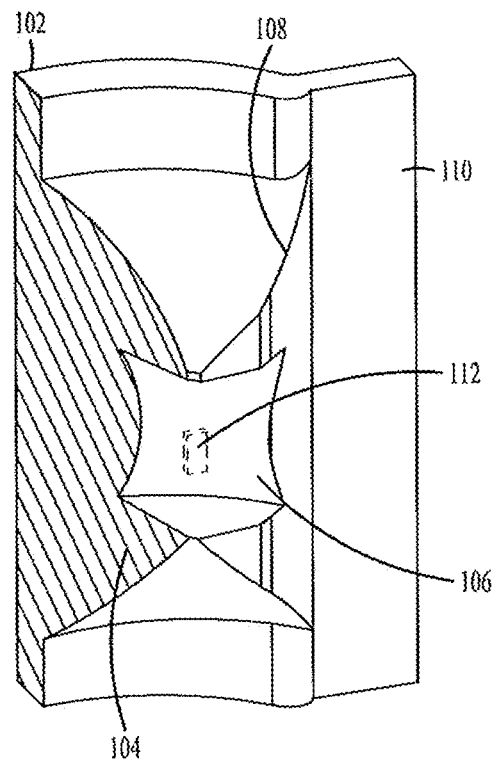
FIG. 1F is a rear perspective view of a cross-sectional view of the unitary silicone prescription optic in FIG. 1A along line F.
Figure 1G:
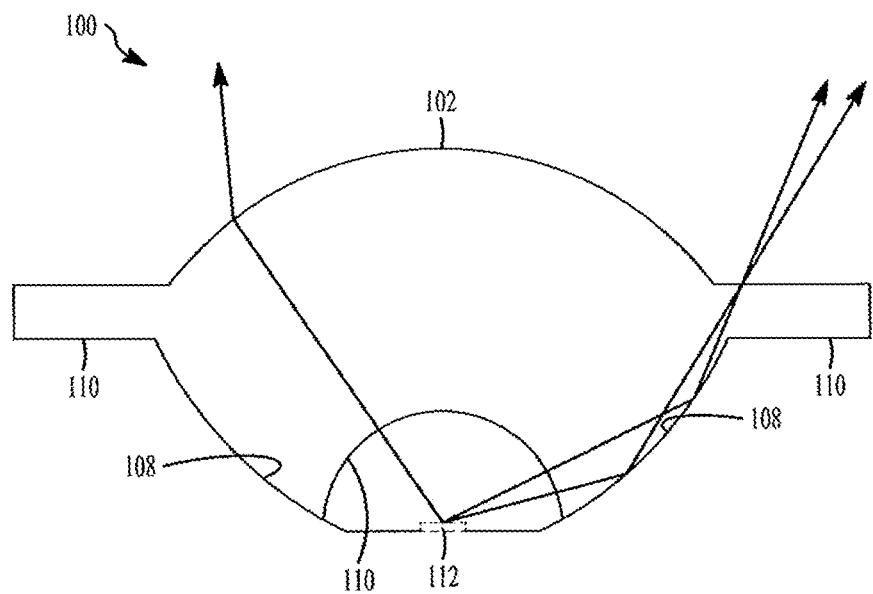
FIG. 1G is a top plan view of the unitary silicone prescription optic in FIG. 1E.
Figure 1H:
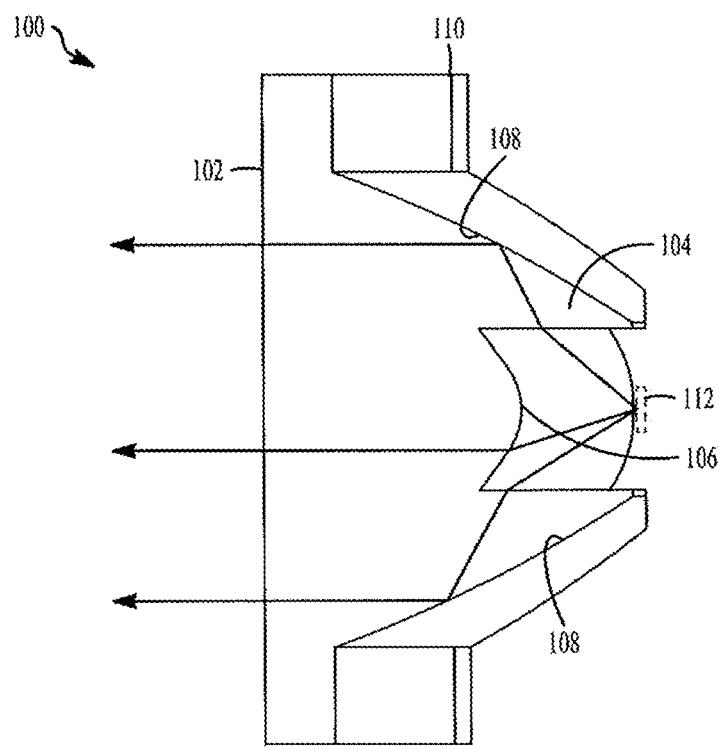
FIG. 1H is a right-side view of the unitary silicone prescription optic in FIG. 1F.

As seen in FIG. 1B, the reflector 104 is integrally molded with the front surface 102. The reflector 104 is configured to receive and reflect light from an LED light source 112, shown in broken line. The reflector 104 will have one or more light-receiving surfaces 106 which are surfaces formed around vertical and horizontal axis. The reflector 104 also has multiple reflecting surfaces 108. FIG. 1D is a side view of the unitary silicone prescription optic 100. FIG. 1E is a perspective view of a cross-section of FIG. 1B along line E, and FIG. 1F is a perspective view of another cross-section of FIG. 1B along line F. FIG. 1G is a top plan view of FIG. 1E, and FIG. 1H is a right-side view of FIG. 1F when viewing from the front. Together FIGS. 1G and 1H illustrate the multiple light reflecting surfaces 108. The multiple light reflecting surfaces 108, providing total internal reflection (TIR) faces, gather the light, making above 85% efficiency possible. The reflector 104, working in collaboration with the light exit surface, front surface 102, is shaped depending on the prescription, application and specifications. The reflector illustrated herein is provided as an example and is not meant to be limiting.

The unitary silicone prescription optic 100 also has integral attachment portions 110 that will hold the unitary silicone prescription optic 100 in a housing or supporting element. Due to the rubber-like, flexible nature of the optical silicone, the unitary silicone prescription optic 100 may be its own sealing gasket to sealing contact the housing. Conventional rigid plastic requires the use of a gasket and/or sealant between the lens and the housing to seal the interior against moisture, for example, from rain, snow and humidity, which can create moisture accumulation in the interior of the lamp or otherwise form condensation on the interior of the lens. Such a gasket or other additional sealing member is not needed as the contact between the housing and the suitably configured unitary silicone prescription optic 100 is such that it seals against weather without the need for a gasket or other additional sealing member. To affect the water-tight contact between the silicone optic and the housing, a simple mechanical retention to create uniform, tight contact, can be used.

The rubber-like flexibility of optical silicone renders thin lenses, or thin areas of lenses, prone to deformation due to external forces such as gravity, external mechanical pressure, aerodynamic pressure, vibrations, etc. Although the integral combination of the lens and the reflector in the disclosed unitary prescription optics will generally result in a structure that is sufficiently thick, and therefore not impacted by the rubber-like flexibility with regard to deformation, some portions of the disclosed unitary prescription optics may be thin enough to be impacted. Accordingly, internal mechanical reinforcement in the thin portions may be desirable.

Figure 3:
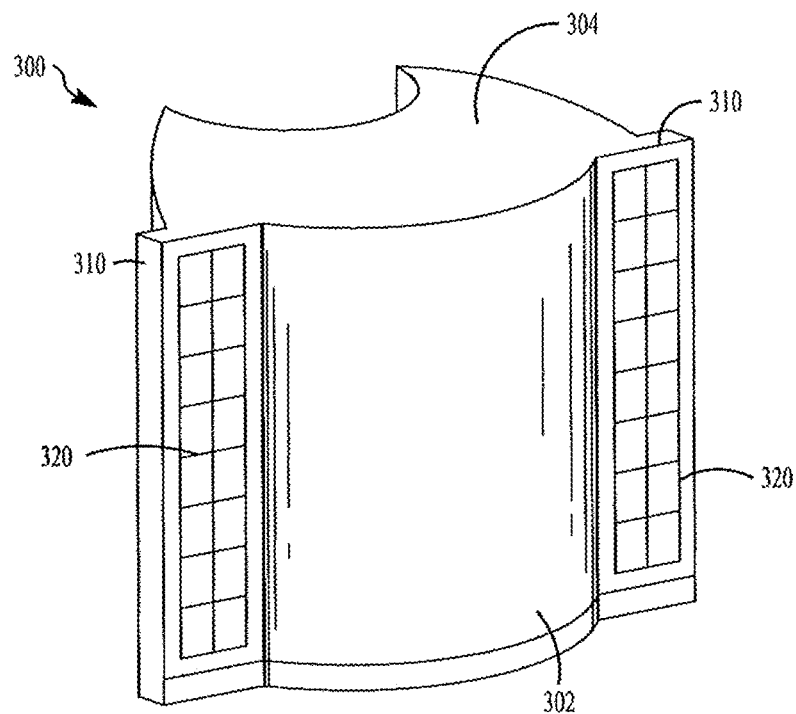
FIG. 3 is a front perspective view of yet another aspect of a unitary silicone prescription optic as disclosed herein with a heating and/or reinforcing embedded within the outer portion of the lens unit.

FIG. 3 illustrates another aspect of a unitary silicone prescription optic 300. As illustrated, the unitary optic 300 is thicker where the lens, or front surface 302, and the reflector 304 are molded and are thinner at the attachment portions 310. To provide structural mechanical strength to the attachment portions 310, a reinforcing structure 320, such as a reinforcing grid, is molded within the silicone material of the attachment portions 310. The unitary prescription optic 300 is internally reinforced at the attachment portions 310 by the suitable mechanically strong reinforcing structure 320, as well as the thickness of the remainder of the optic. The reinforcing structures 320 can be of any design that provides sufficient structural support to the optic and may be selected based on aesthetics or other reasons. The reinforcing structure 320 may be constructed from a variety of known materials, such as, but not limited to, thin wires, molded plastics, cast or molded metals, metal stampings and the like, the material being different from silicone. The reinforcing structure 320 is not limited to the attachment portions 310. The lens itself may be sufficiently thin in nature to experience mechanical deformation under common use conditions, brought about by vibration, mechanical pressure, aerodynamic loads or even the force of gravity given the high degree of flexibility associated with optical silicone's rubber-like properties. A mechanical internal reinforcement may be insert molded within the thickness of the lens in order mechanically stabilize the lens. This reinforcement devise can also perform the function of a heating mechanism via the suitable configuration of these reinforcements to provide a heating function via, for instance, the application of electric current to all or portions of the reinforcing grid. The reinforcing structures can be designed so as not to interfere with the light pattern created be the lens and/or reflector.

Figure 4A:
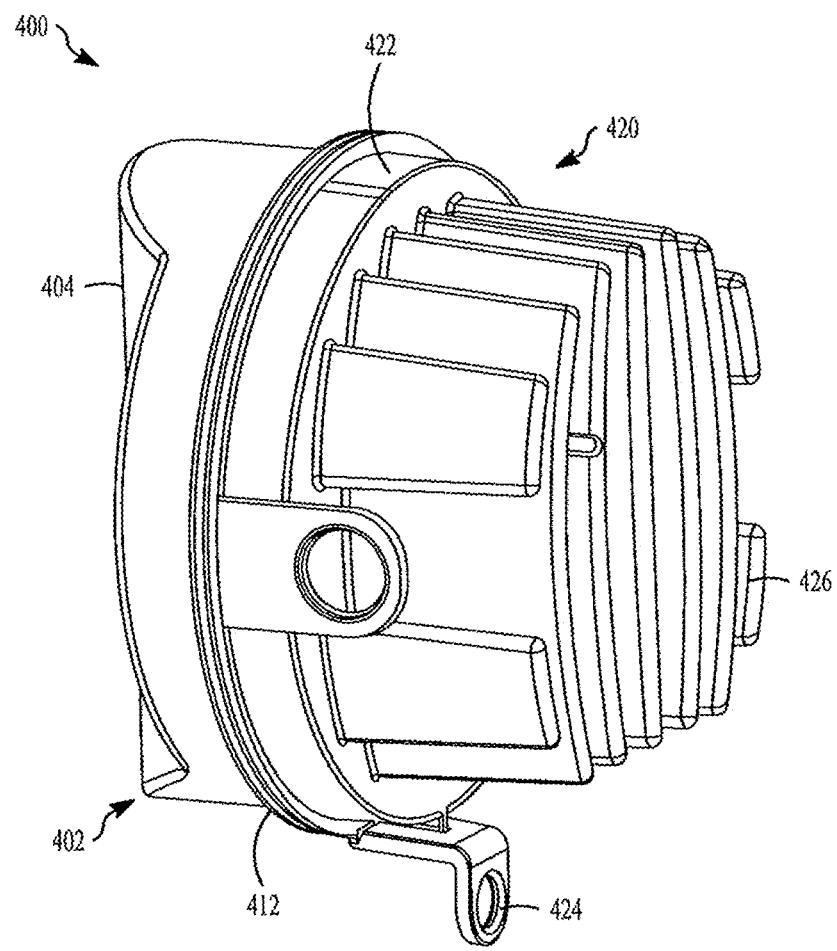
FIG. 4A is a perspective view of a lamp with a single-stage optic as disclosed herein.
Figure 4B:
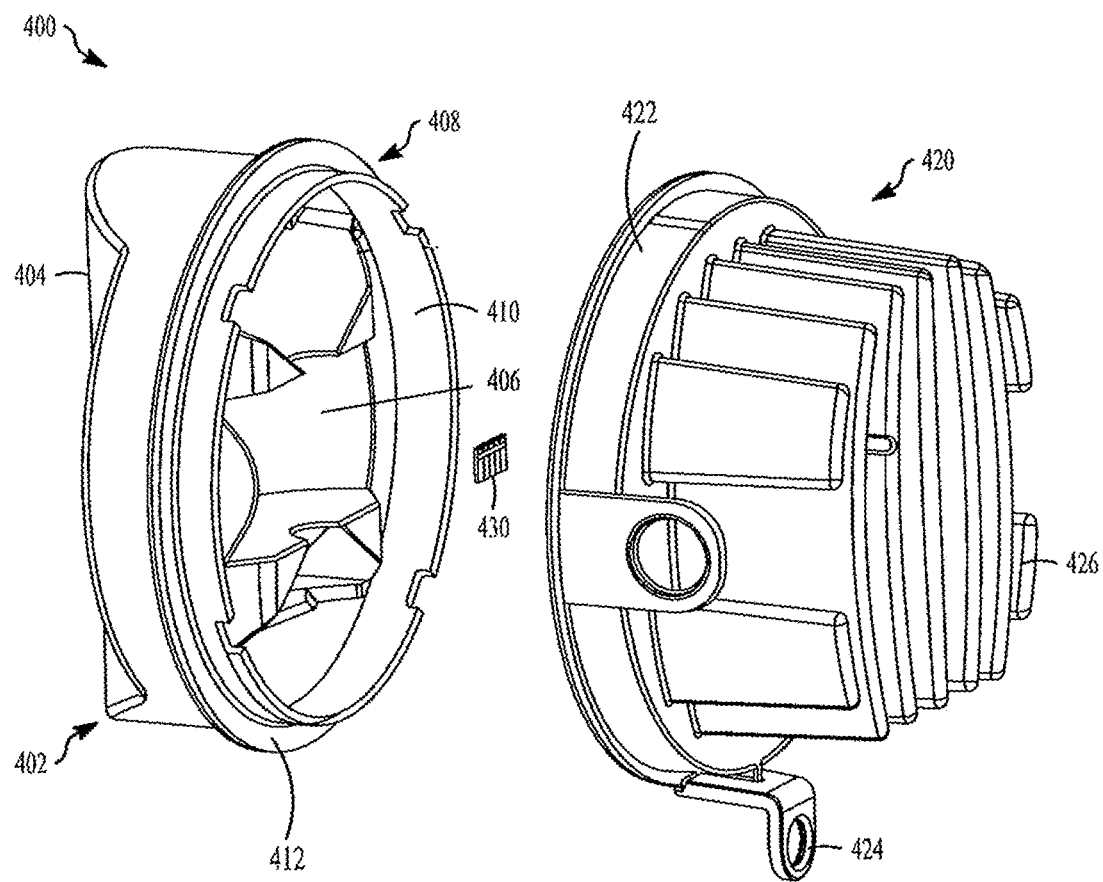
FIG. 4B is an exploded view of the lamp of FIG. 4A.

Also disclosed herein are lamps having a single-stage optic, such as for vehicle applications. One example of a lamp for a vehicle with a single-stage optic is illustrated in FIGS. 4A and 4B, with FIG. 4B being an exploded view of FIG. 4A. The lamp 400 has a unitary molded body 402 molded from silicone. The unitary molded body 402 has a round cross-section and is different from those depicted in the other drawings as a means of providing an example of a different shape and prescription. It is to be noted that the unitary molded body can have any cross-sectional shape as required by the design of the lamp such that it engages the housing. The unitary front surface and reflector can be of differing designs depending on the prescription. In FIG. 4, the unitary molded body has a front surface 404 configured as a light exit, an integral reflector 406 molded to, which in cooperation with the front surface 404 meets a prescription light output, and an integral attachment portion 408. As shown, the attachment portion 408 has a first attachment member 410 and a second attachment member 412. The attachment portion 408 can be of any configuration that provides the requisite attachment to the housing, creating a water-tight seal without the need for an additional sealing member such as a gasket, although this does not preclude the use of adhesives or any other fastening means if so desired. The attachment portion 408 in FIG. 4 includes the first attachment member 410 to fit within a housing 420 and the second attachment member 412, contacting the housing in a flange-like capacity. Either or both of the first attachment member 410 or the second attachment member 412 can include a reinforcing structure as previously described.

The lamp 400 also includes an LED light source 430, the integral reflector receiving and reflecting light from the LED light source 430. The LED light source is not limited and can be one or more LEDs and can include a circuit board and/or other means of powering and controlling the LED(s). A housing 420 is configured to sealingly engage the unitary molded body 402 as well as mount the unitary molded body 402 within a vehicle exterior, the integral attachment portion 408 attached directly to the housing 420 without an additional seal member. The housing 420 includes a single stage lens attachment 422 configured to attached to the unitary molded body 402, attachment members 424 to attach the lamp 400 to a vehicle or other lighting application, and, optionally, a heat sink 426. The heat sink 426 may also or alternatively be provided at the LED light source.

The unitary silicone prescription optics disclosed herein provide a single-stage optic with integrally molded reflector, the optic molded from silicone and capable of complex prescriptions that meet the regulatory requirements for regulated lighting applications either singly or in cooperation with one or more additional light units suitably configured to provide the overall desired optical beam pattern results. The unitary silicone prescription optics provide a much lighter lamp beneficial to all vehicles, and particularly autonomous vehicles and electric vehicles. Because the optic is a single component, the optics can exceed 85% efficiency, a significant increase over conventional lamps, which lose about 10% to 15% efficiency for each optical component through which light passes or is reflected therein. The unitary silicone prescription optics can be used with high power LEDs as the silicone has a higher temperature resistance than conventional plastic lenses. The disclosed prescription optics are used without any coatings or outer lenses, as the silicone is effectively impervious to US damage and most damage from road debris impingement although additional coatings may be utilized in order to achieve even higher robustness and chemical resistance requirements. The prescription optics disclosed herein can be mounted directly into the vehicle lamp housing, without the need for an additional member such as a gasket, as the silicone acts as a seal, protecting the optic from weather related issues liquid, dust or other debris ingress. An adhesive or mechanical retention may be used to obtain a uniform, tight fit between the housing and the optic. Because the optic is one piece, there is no alignment necessary between components when installed in the application.

The use of the silicone enables single-point adjustment of the prescription optic. The single-point adjustment mechanism can be used with the prescription optics disclosed herein, as well as conventional plastic or glass lenses, so long as the conventional plastic lenses have a portion of the lens covered or over-molded in a compliant material such as rubber or silicon, that portion being the portion through which the adjustment mechanism extends.

Figure 5A:
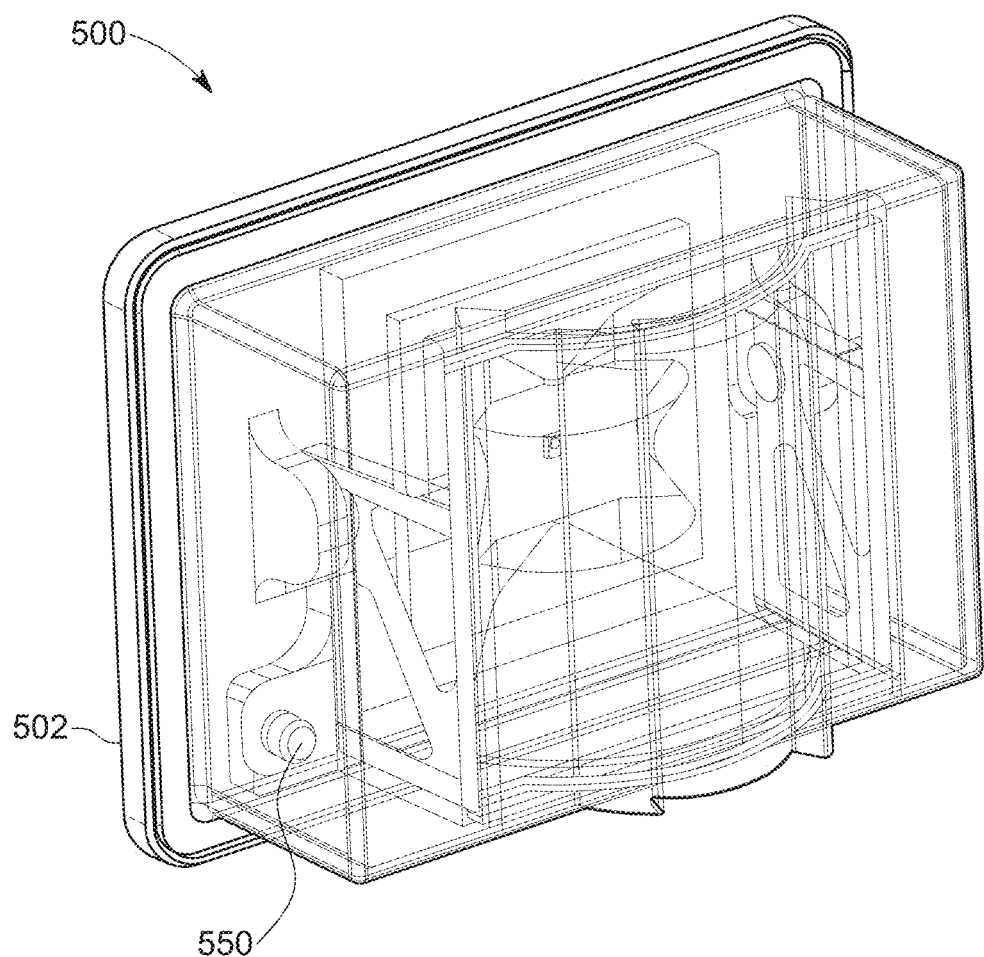
FIG. 5A is a front perspective view of a prescription lamp with single point adjustment as disclosed herein with a transparent skirt.
Figure 5B:
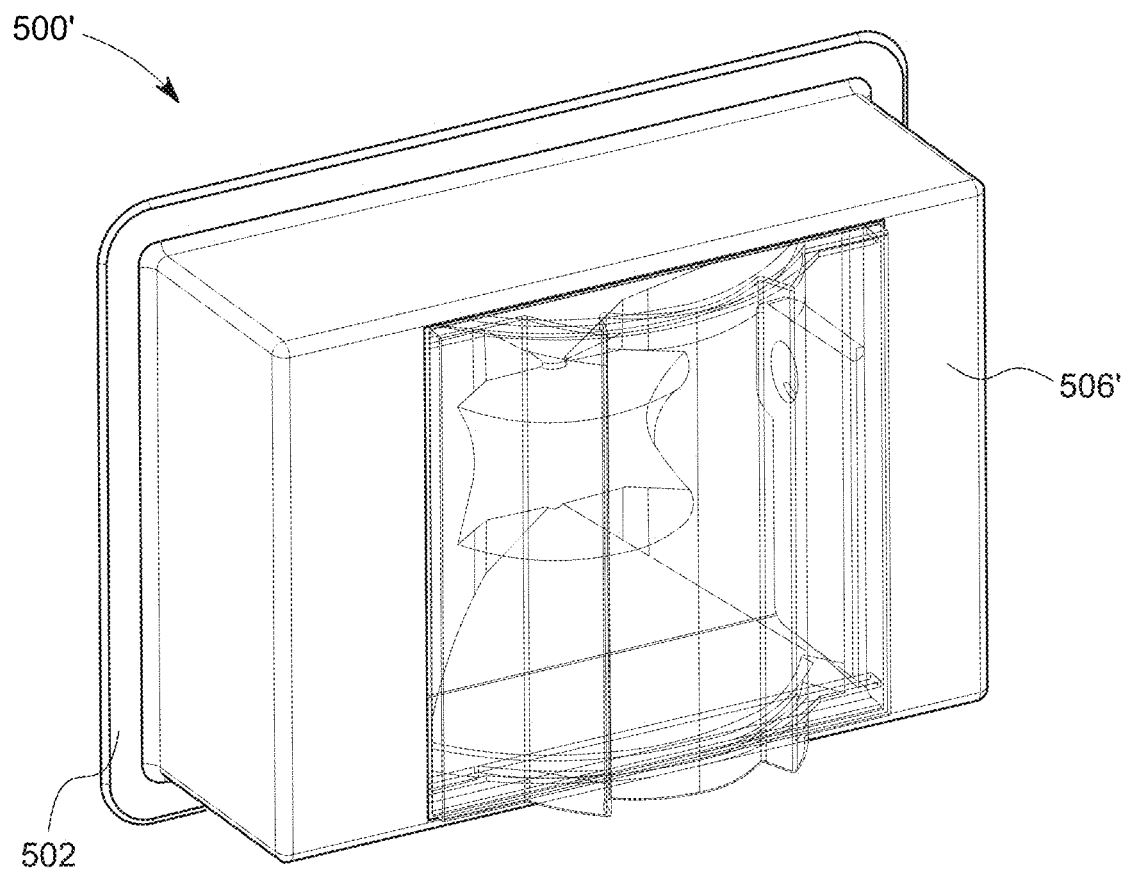
FIG. 5B is a front perspective view of a prescription lamp with single point adjustment as disclosed herein with an opaque skirt.
Figure 6A:
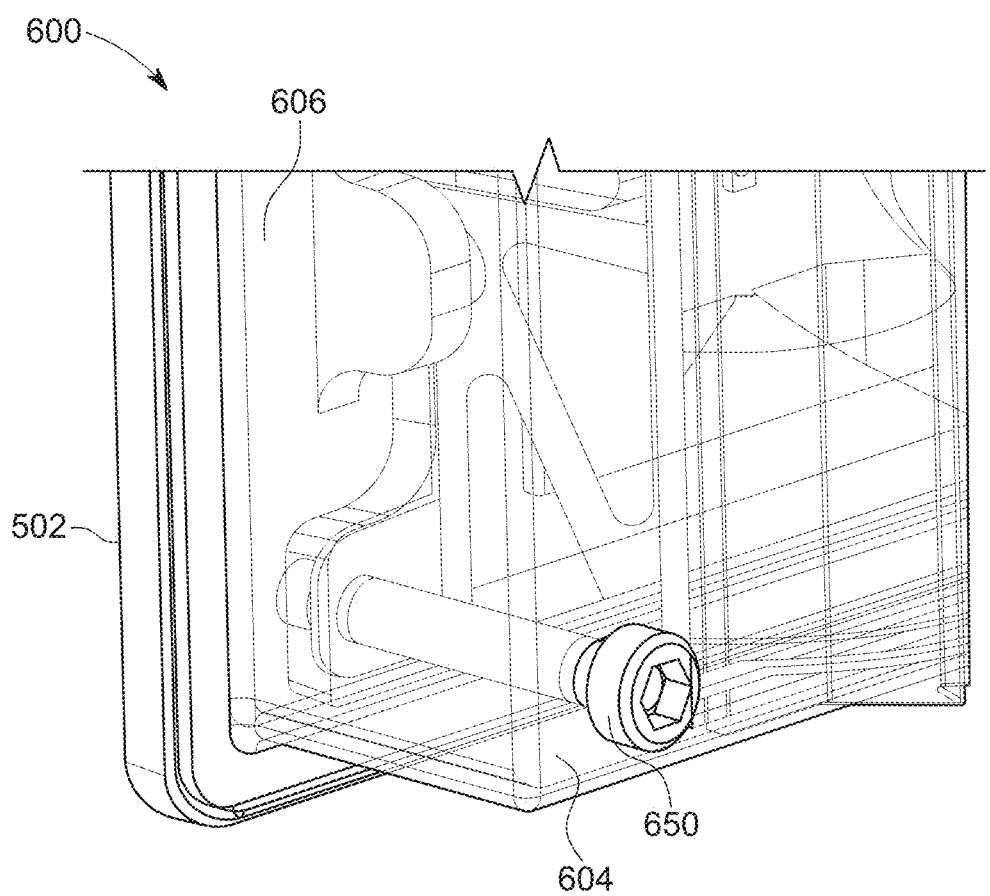
FIG. 6A is an enlarged portion of a prescription lamp illustrating a front-accessible adjustment mechanism.
Figure 6B:
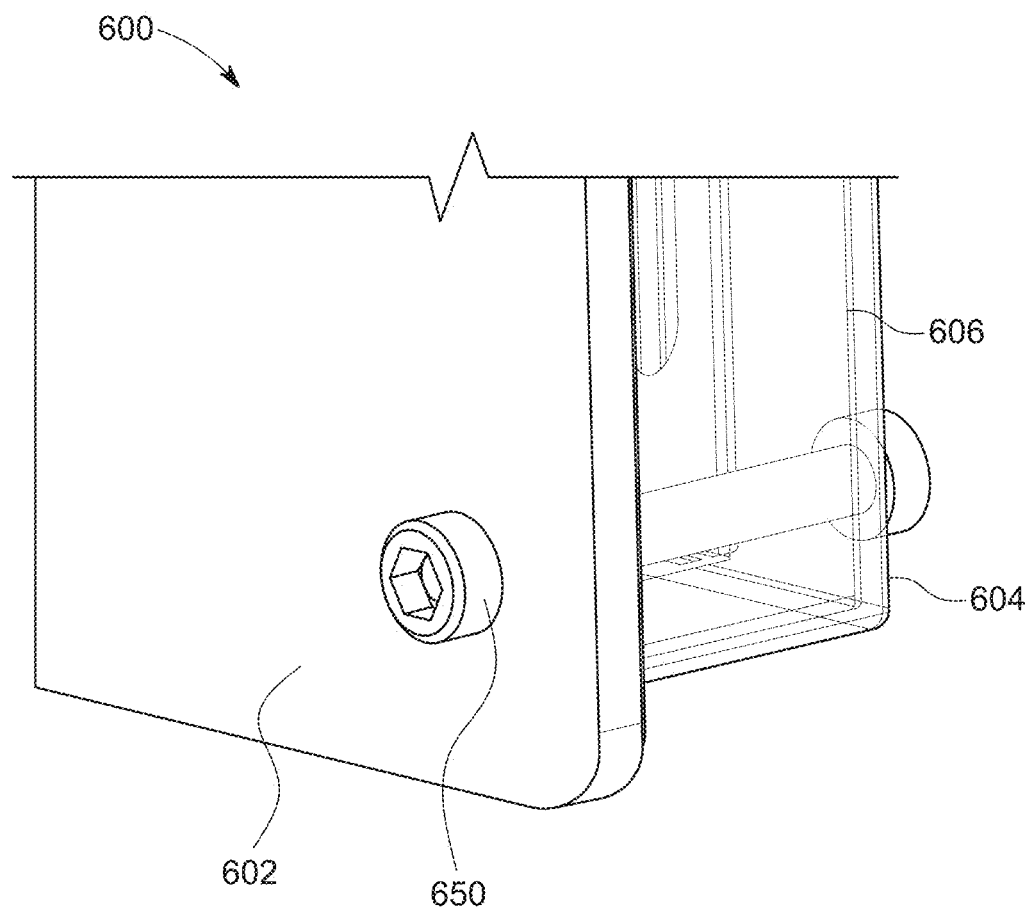
FIG. 6B is an enlarged portion of a rear perspective view of the prescription lamp in FIG. 6A showing the adjustment mechanism also accessible from the rear.

FIG. 5A is a perspective view of a prescription lamp 500 with a single-point adjustment mechanism 550. FIG. 5A is illustrated with a substrate 502 and a transparent skirt 506 in contact with the substrate 502. FIG. 5B is a perspective view of the prescription lamp 500' with an opaque skirt 506' mounted on the substrate 502. In FIGS. 5A and 5B, the single-point adjustment mechanism 550 is only accessible from a substrate 502 side. FIGS. 6A and 6B are enlarged views of a prescription lamp 600 with a single-point adjustment mechanism 650 accessible from both the front side 604, through skirt 606, and the heat-sink side 602.

Figure 7:
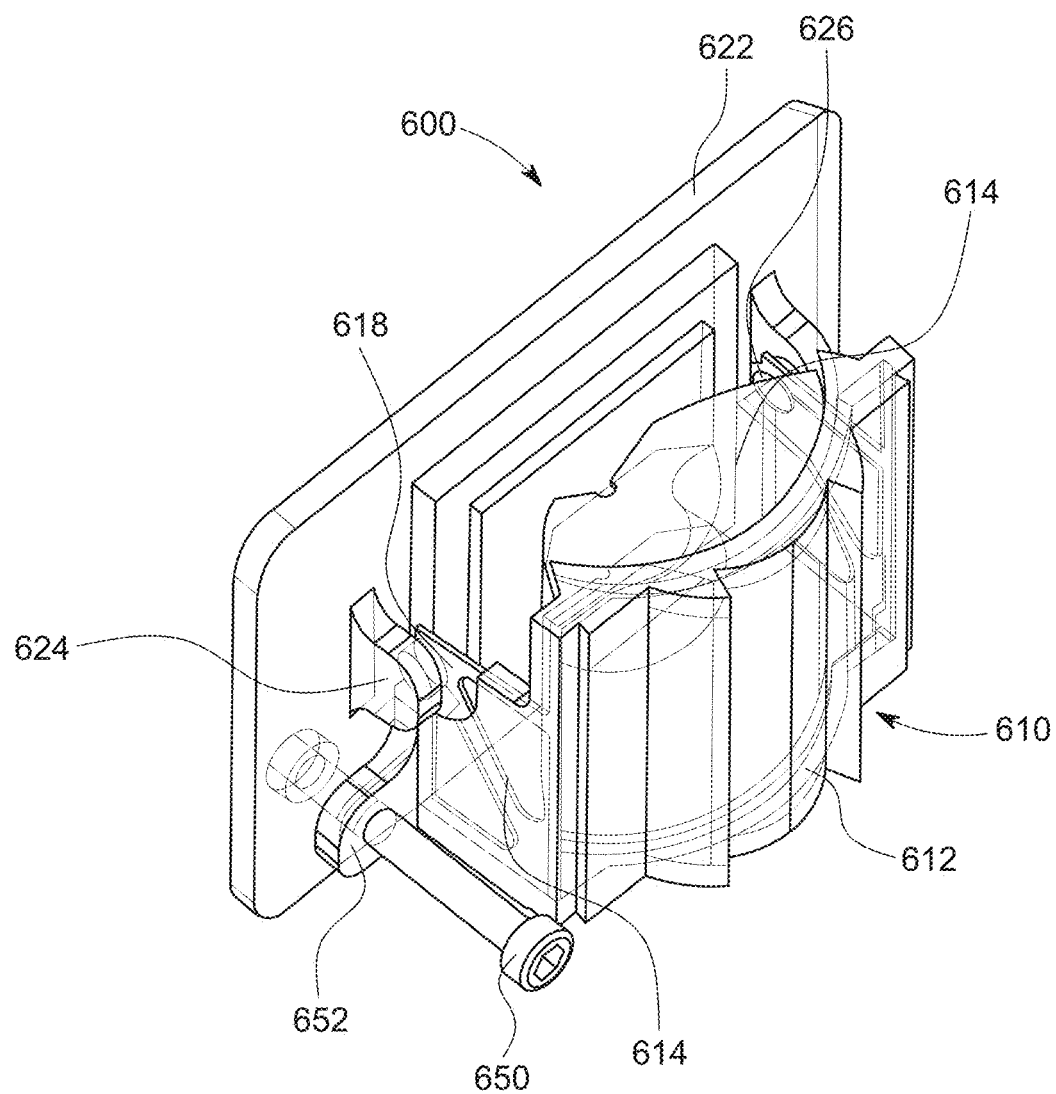
FIG. 7 is a front perspective view of a prescription lamp as disclosed herein with the skirt removed to better highlight the components.

FIGS. 7 and 8A-8C will be used to describe the single-point adjustment mechanism 650. FIG. 7 illustrates the prescription lamp 600 with the compliant skirt 606 removed. The prescription lamp 600 has a prescription optic 610 as disclosed herein. The prescription optic 610 is a unitary molded body molded from silicone comprising a front surface 612 configured as a light exit, an integral reflector 614 molded to meet a prescription light output, an integral attachment portion 616, and a reinforcing structure 618 molded with the unitary molded body, the reinforcing structure 618 imparting structural strength to the attachment portion 616. An LED light source is included (not shown), the integral reflector 614 receiving and reflecting light from the LED light source. The LED light source can be one or more of any kind of LED and can include one or more LED circuit boards. A substrate 622 carries the LED light source. The substrate 622 can be a supporting structure on which to mount the LED light source and prescription optic 610 or can additionally be a heat sink for the LED light source. A pivot mechanism 624 extends from the substrate 622 and has opposing pivots 626, wherein the reinforcing structure 618 is hingedly attached to the opposing pivots 626. The attachment portion 616 includes an alignment portion 620 integrally extending from the attachment portion 616 parallel to the substrate 622. The adjustment mechanism 650 extends through an aperture 652 in the alignment portion 620 of the reinforcing structure 618 at a position where the reinforcing structure 618 is covered with the compliant skirt 606. The compliant skirt 606 is a cover that fits around the front surface 612 of the optic 610 and is attached to the substrate 622 to cover and protect the attachment and alignment structures of the lamp 600. The front surface 612 is exposed to atmosphere as the silicone lens does not require any further lenses or covers to protect is from atmosphere as described earlier herein.

Figure 8A:
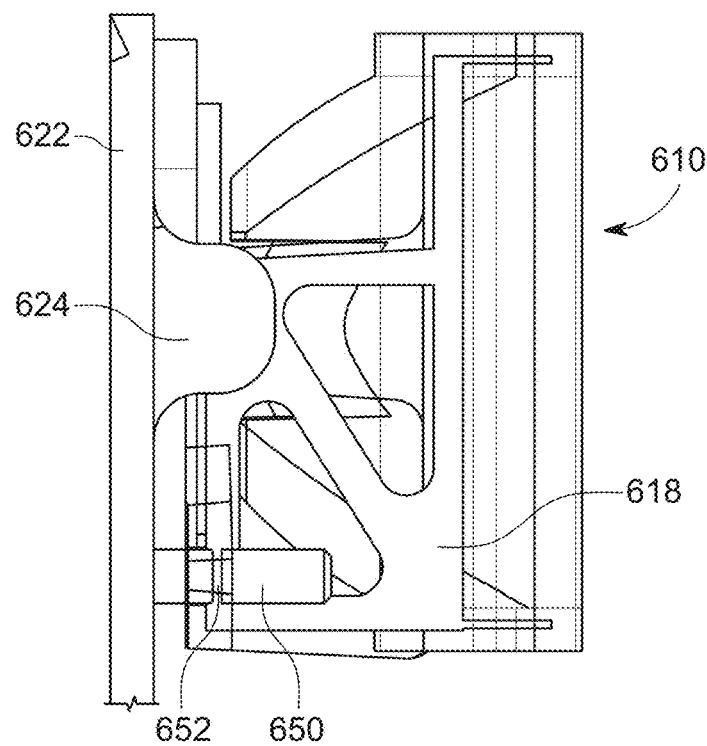
FIGS. 8A-8C are partial side views of FIG. 7 illustrating adjustment of the lens using the adjustment mechanism disclosed herein.
Figure 8B:
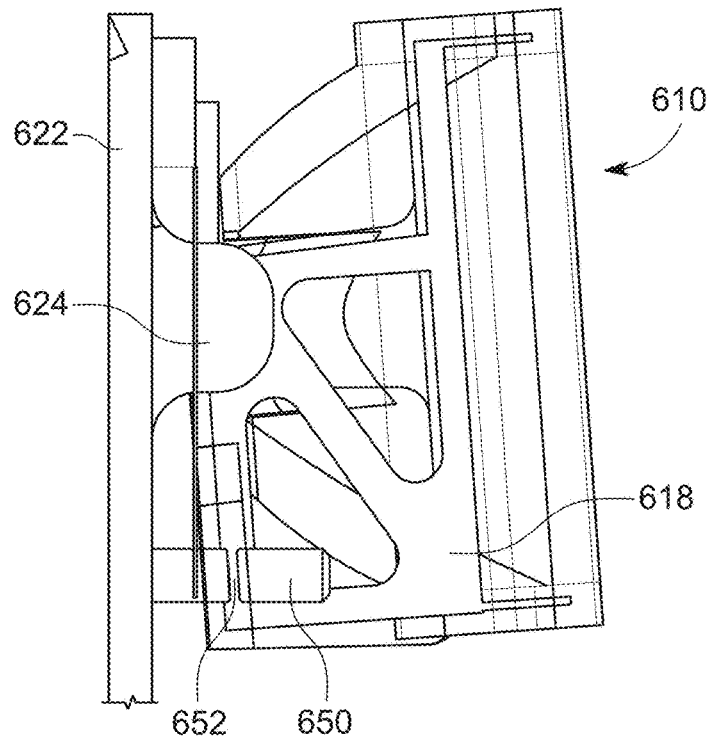
Figure 8C:
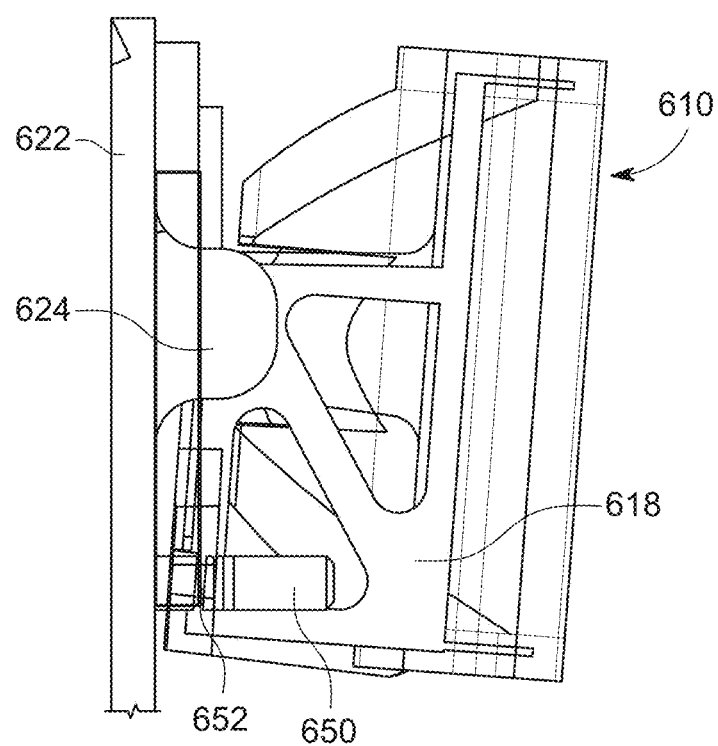

The single-point adjustment mechanism 650 can be a rotatable mechanism that is accessible from the front of the lamp 600, outside of the skirt 606, or from the rear of the lamp 600, outside of the substrate 622, or from both the front and the back of the lamp 600. As a non-limiting example, the adjustment mechanism 650 can be a screw that is threaded with the single aperture 652 of the reinforcing structure 618. To be accessible from both the front and back of the lamp 600, the screw would extend external to the skirt 606 as shown in FIG. 6A and through the substrate 622 as shown in FIG. 6B. The end of the adjustment mechanism 650 accessible from the substrate 622 can be flush with the substrate 622 as illustrated in FIGS. 8A-8C. The adjustment mechanism 650 can be threaded only at its interface with the aperture 652 in the reinforcing structure 618 to move the reinforcing structure 618, and thus the prescription optic 610, relative to the pivots 626. As a non-limiting alternative, the adjustment mechanism 650 may be fixedly attached to the reinforcing structure 618 at the aperture 652 via adhesive or flanges on either side of the reinforcing structure 618, and then threaded with the substrate 622 through substrate aperture 630. Any configuration is acceptable so long as the adjustment mechanism 650 is configured to move and fix the reinforcing structure 618, and thus the prescription optic 610, relative to the pivots 626.

FIG. 8A illustrates a neutral position of the prescription optic 610, with no degree of tilt with respect to the substrate 622. When the adjustment mechanism 650 is rotated one way, the reinforcing structure 618 moves in a first direction with respect to the pivots 626, thus moving the entire silicone optic 610 molded with the reinforcing structure 618 about the pivot mechanism 624, or the focal point, in the first direction, illustrated in FIG. 8B. Rotating the adjustment mechanism 650 the other way will conversely move the entire reinforcing structure 618 with the integral silicone prescription optic 610 about the pivot mechanism 654 in a second, opposite direction as illustrated in FIG. 8C. The movement needed for alignment of the lamp is small, commonly about 4 degrees in either direction.

Figure 9:
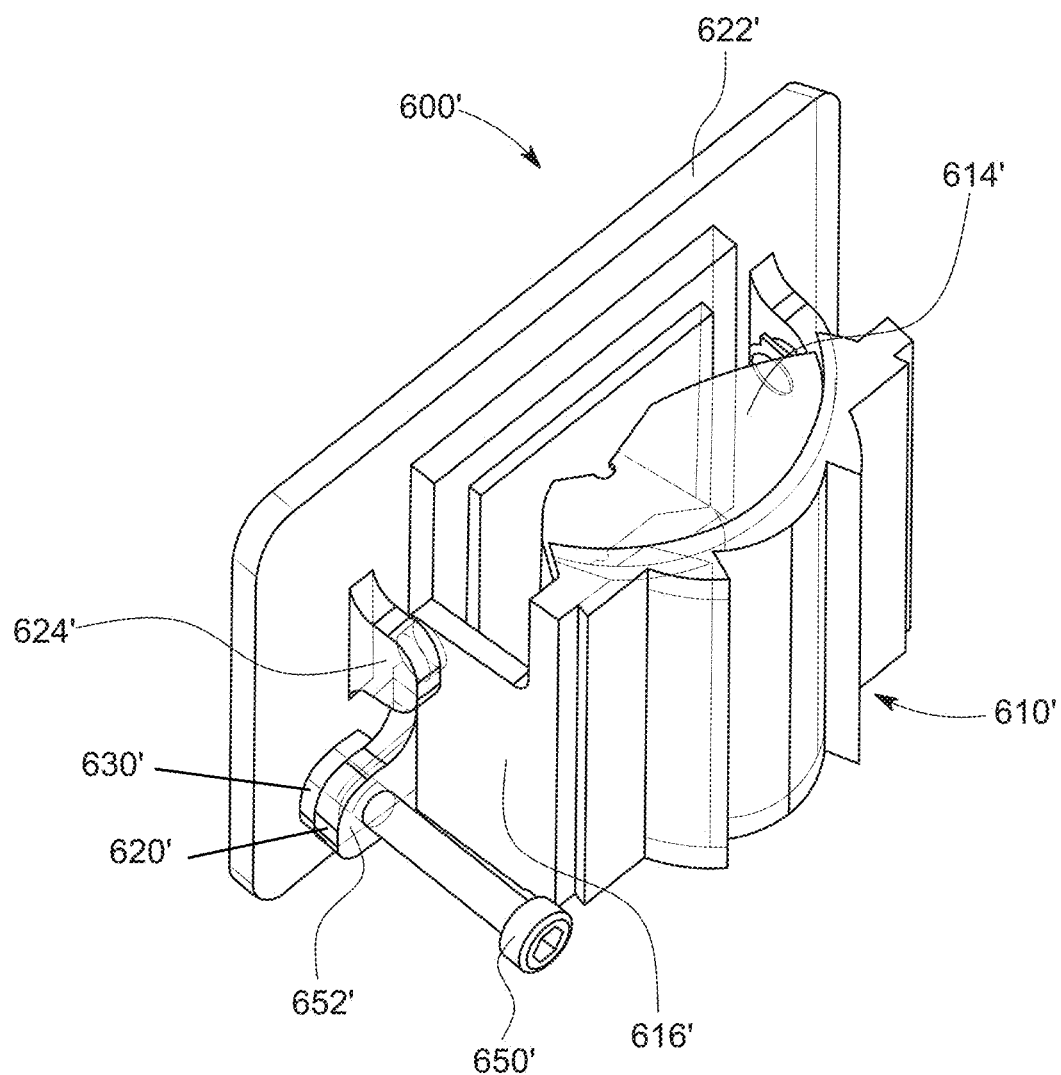
FIG. 9 is a front perspective view of another prescription lamp as disclosed herein with the skirt removed to better highlight the components.

The single-point adjustment mechanism 550, 650 works with the reinforced silicone optic because the silicone is flexible. The silicone will compress or extend as the reinforced structure is tightened or loosened against the heat sink via the adjustment mechanism, in turn moving the silicone optic about the focal point, or axis of the pivots because the reinforcing structure extends throughout the attachment portion of the unitary molded body and is attached to the opposing pivots. With a plastic lens or optic, there will be no flexibility for the adjustment mechanism to act upon, thereby precluding this type of adjustability. It is contemplated that a plastic, glass or other clear material lens could be used with the single-point adjustment mechanism if at least the point of adjustment, and at least between the lens and the substrate or heat sink, there is a covering or overmold of silicone, rubber or another flexible material. This would allow the plastic, glass or other suitable material lens to move about the pivot as the adjustment mechanism is rotated, either compressing the covering or allowing the covering to expand. As illustrated with the lamp 600' in FIG. 9, as no reinforcing structure is needed with the optic 610' of a suitable material other than silicone, the aperture 652' through which the single-point adjustment mechanism 650' extends is in an alignment portion 620' of attachment portion 616' of the non-silicone optic 610', both of which are also the suitable non-silicone material. The attachment portion 616' is also directly attached to the pivot mechanism 624'. To allow for the small degree of alignment necessary, the alignment portion 620' of the glass or plastic prescription optic 610' is covered in a flexible material 630', such as silicone or rubber, between the alignment portion 620' and the substrate 622'. Providing the flexible material 630' between the rigid glass, plastic or other suitable material alignment portion 620' and the substrate 622' allows for the small degree of movement necessary for the alignment of the prescription optic 610'.

Figure 10A:
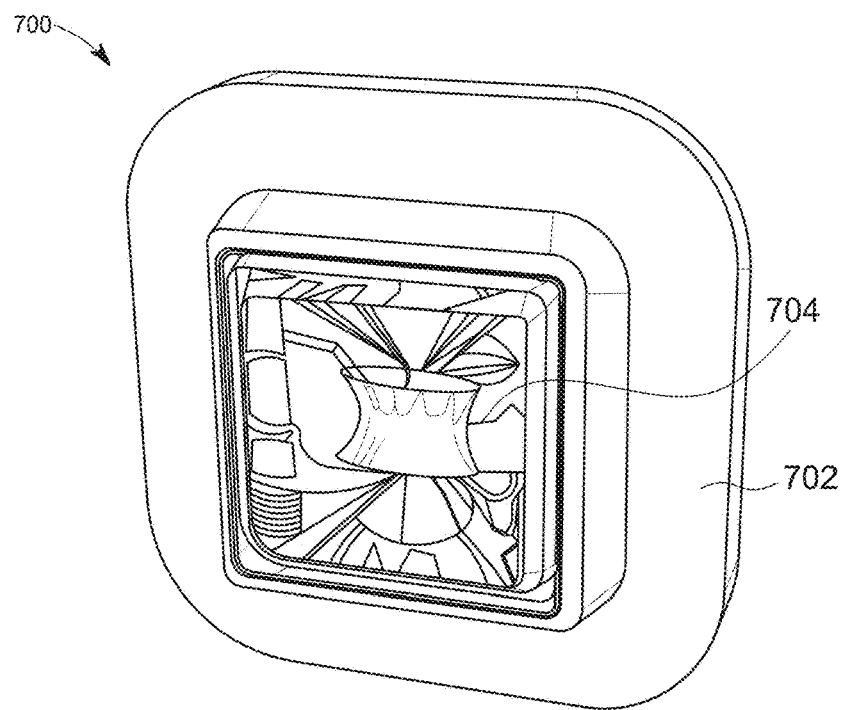
FIG. 10A is a front perspective view of a vehicle headlamp as disclosed herein.
Figure 10B:
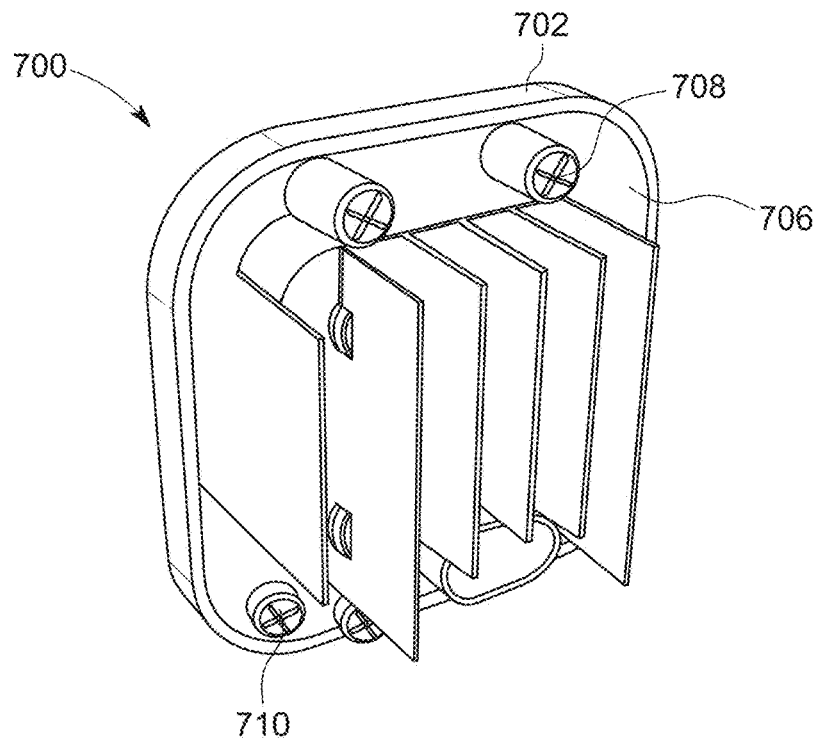
FIG. 10B is a rear perspective view of the vehicle headlamp in FIG. 10A.

FIGS. 10A and 10B illustrate a prescription lamp 700 with a housing 702. In FIG. 10A, the housing 702 conforms to the skirt 704 of the silicone optic 710. FIG. 10B illustrates the substrate 706 as a heat sink, this one with fins to expand the surface area to improve cooling. Four fasteners 708 are illustrated to attach the optic module to the housing 702. The single-point adjustment mechanism 750 is accessible from the heat sink side of the lamp. The housing 702 can be attached to the substrate 706 via any acceptable means such as adhesive, clips, etc.

Figure 11A:
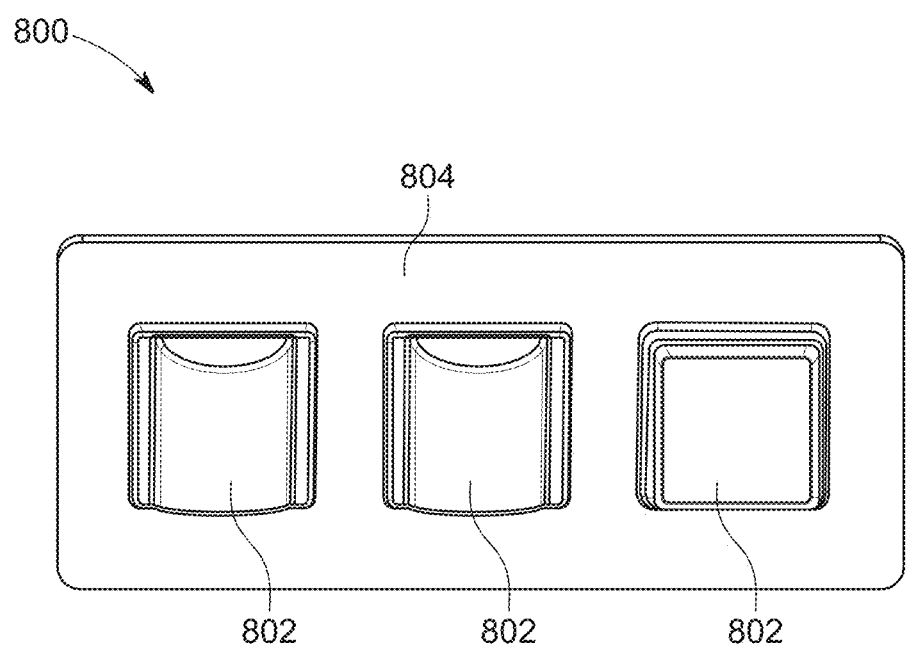
FIG. 11A is a front plan view of a multi-element vehicle headlamp and vehicle component as disclosed herein.
Figure 11B:
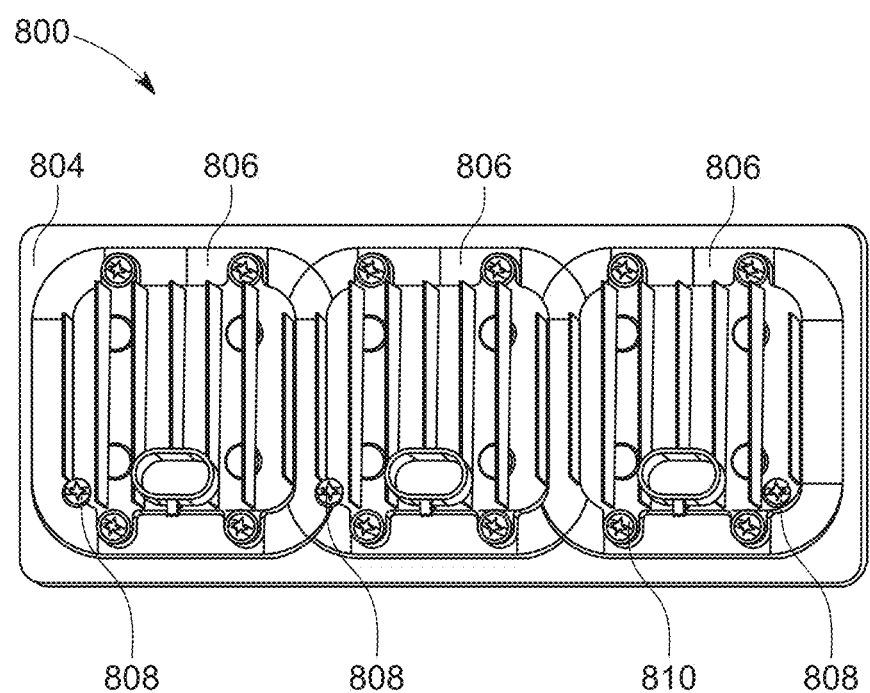
FIG. 11B is rear plan view of the multi-element vehicle headlamp and vehicle component of FIG. 11A.
Figure 12A:
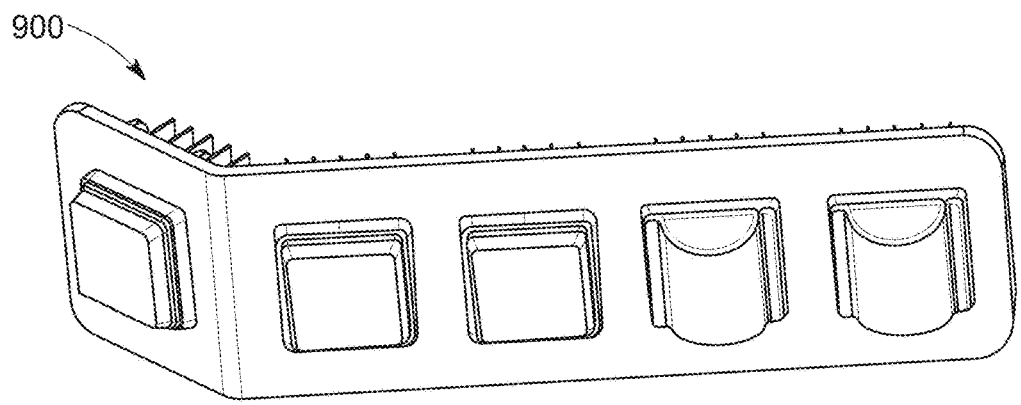
FIG. 12A is a front perspective view of a vehicle headlamp and vehicle component as disclosed herein.
Figure 12B:
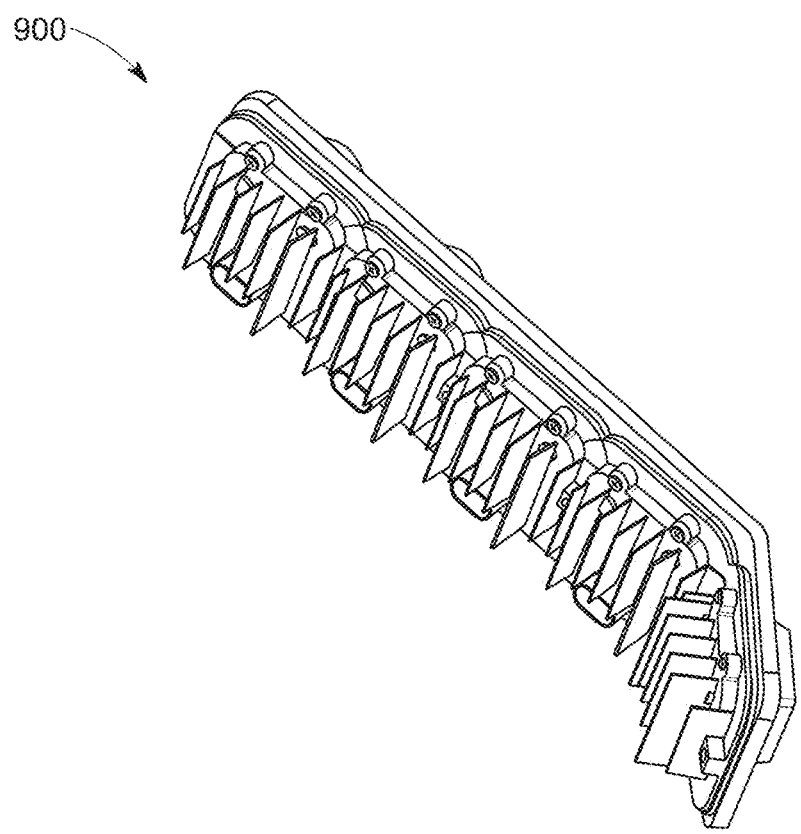
FIG. 12B is rear perspective view of the vehicle headlamp and vehicle component of FIG. 12A.

It is also noted that the single-point adjustment mechanism can be used with a structural headlamp as disclosed in U.S. Pat. No. 8,845,128 entitled "Structural Headlamp Assemblies for Vehicular Applications," incorporated herein by reference. The internally adjustable module shown in FIGS. 5-8 can be mounted through the structural element. The structural element becomes the lamp's housing. As illustrated in FIGS. 11A and 11B, a vehicle headlamp and component assembly 800 can include one or more lenses, with this example showing three lamps 802, a vehicle structural element 804 as the lamp housing cooperating with the lamp 802 to at least partially define a lamp chamber that is generally fluidly isolated from an ambient atmosphere outside the lamp chamber, at least one light source provided in the lamp chamber, a substrate 806, this one shown as a heat sink with fins to increase the surface area and improve cooling, the substrate 806 carrying the light source, with the lens pivotally attached to the substrate 806 as previously described. The vehicle structural element 804 is configured to bear structural loads applied by a vehicle component. A single-point adjustment mechanism 850 is positioned through an adjustment portion of the lens. The substrate 806, which carries the skirt, prescription optic, the light source and the adjustment mechanism, is attached to the vehicle structural element 804 via fasteners 810, as a non-limiting example. It is noted that each lamp 802 is adjusted individually with its respective adjustment mechanism 850. The lamp 802 can have an integral silicone prescription optic with a reinforced structure and a skirt as disclosed herein, or can be plastic, glass or other suitable material, so long as the lens is covered with silicone or rubber or the like between the alignment portion and the substrate at the point of adjustment, and the lens is attached via the pivot. FIGS. 12A and 12B are a vehicle headlamp and component assembly 900 as described with respect to FIGS. 11A and 11B except with five individual lamps and a non-linear formation configured to provide increased lateral illumination, such as the function of a cornering lamp or other similarly configured function. The vehicle headlamp and component assembly 900 also has a vehicle structural element 904.

Figure 13:
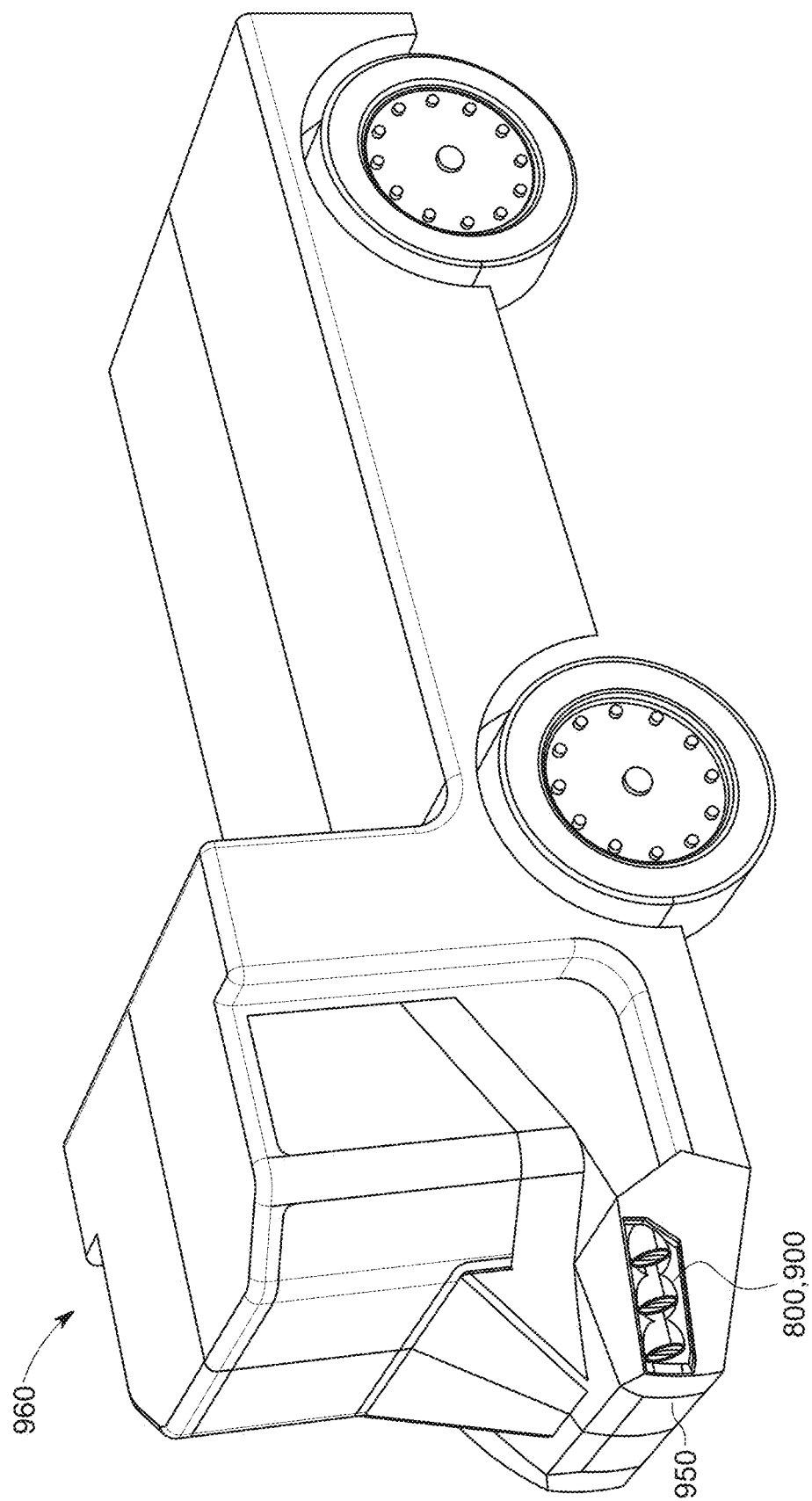
FIG. 13 is an illustration of a vehicle incorporating a multi-element vehicle headlamp as disclosed herein.

The vehicle structural element 804, 904 can be an exterior structure of a vehicle, such as an exterior panel, fender, bumper, reinforcement, a shield, etc. The vehicle structural element, as the lamp housing, is configured to support a load from a vehicle component which can be, as non-limiting examples, an inner fender support, a radiator support/module, a vehicle structural member, a battery box, an electronic control module, a snow-plow support structure, and a reinforcing structure. FIG. 13 is an illustrative example of a vehicle headlamp and component assembly 800,900 as described with respect to FIGS. 11A and 11B and 12A and 12B wherein the vehicle structural element 804, 904 is a front fender or bumper 950 of the vehicle 960.

Figure 14:
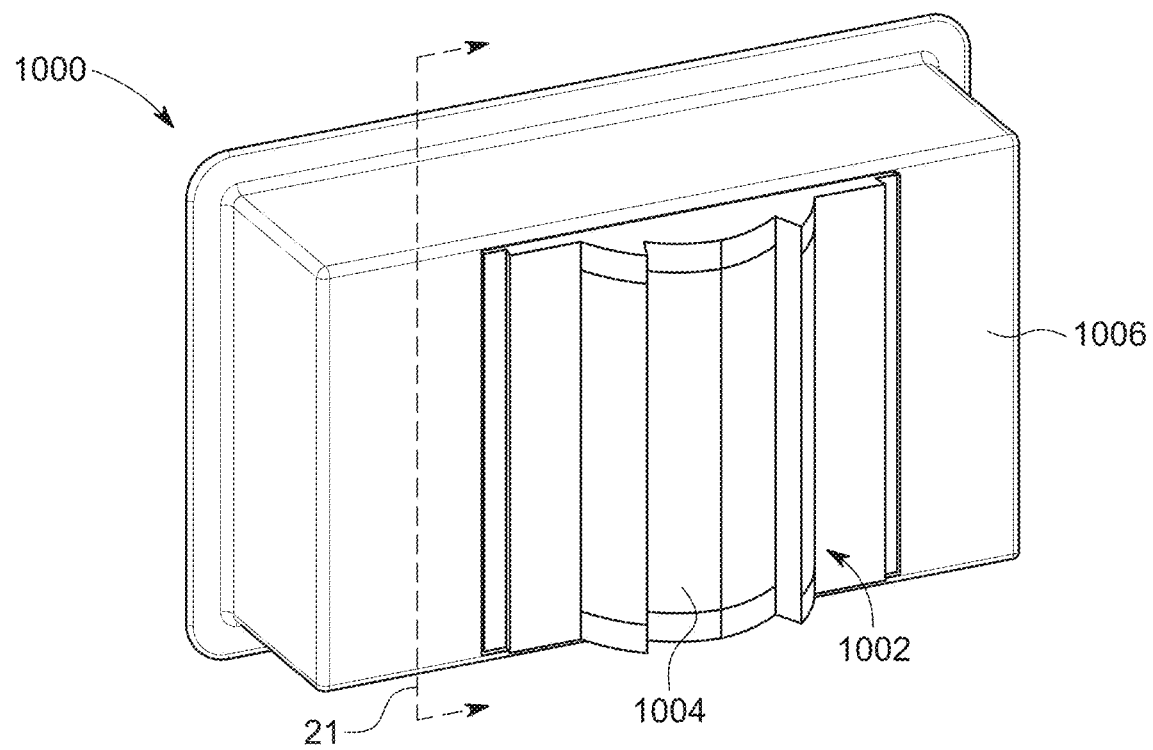
FIG. 14 is a front perspective view of a vehicle lamp having a dual axis adjustment mechanism as disclosed herein.
Figure 15:
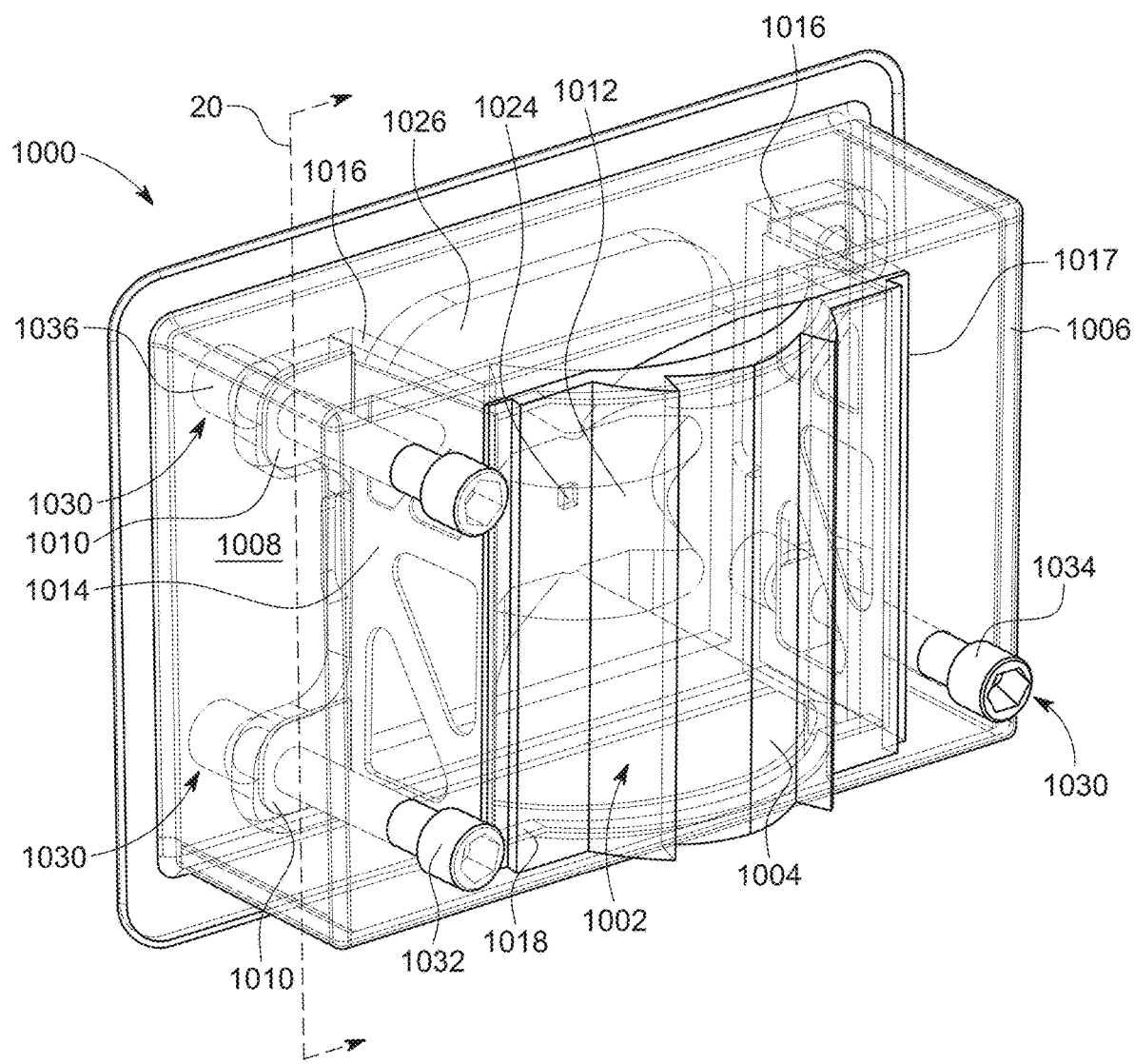
FIG. 15 is a front perspective view of another aspect of a vehicle lamp having the dual axis adjustment mechanism as disclosed herein, with the skirt shown as transparent.
Figure 16:
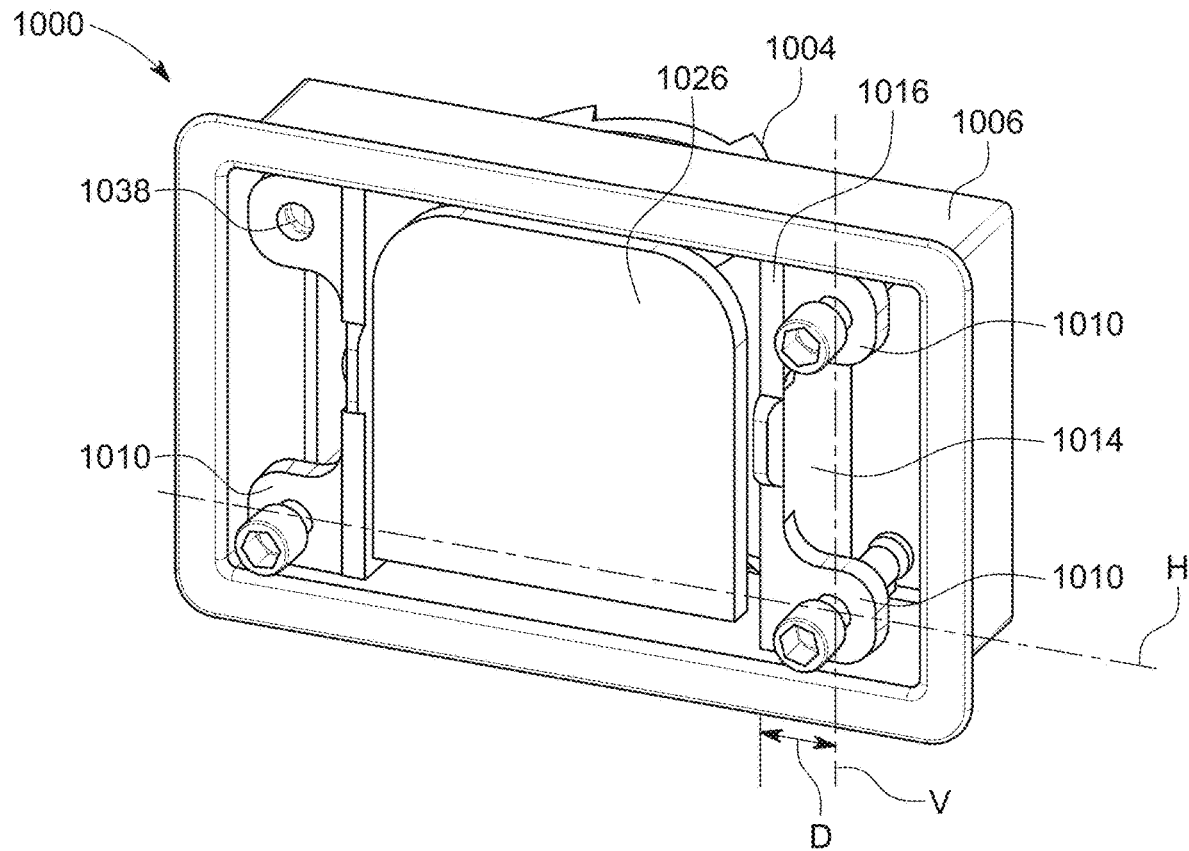
FIG. 16 is a rear perspective view of the vehicle lamp of FIG. 14 with the substrate removed.
Figure 17:
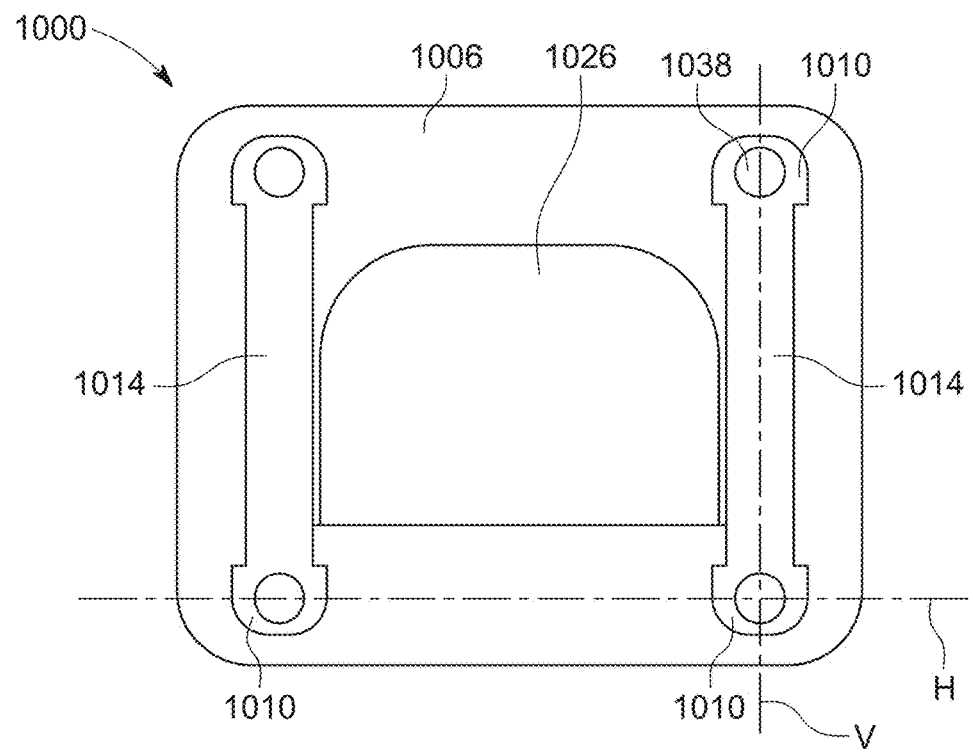
FIG. 17 is a rear view of another embodiment of a vehicle lamp having a dual axis adjustment mechanism as disclosed herein.
Figure 18:
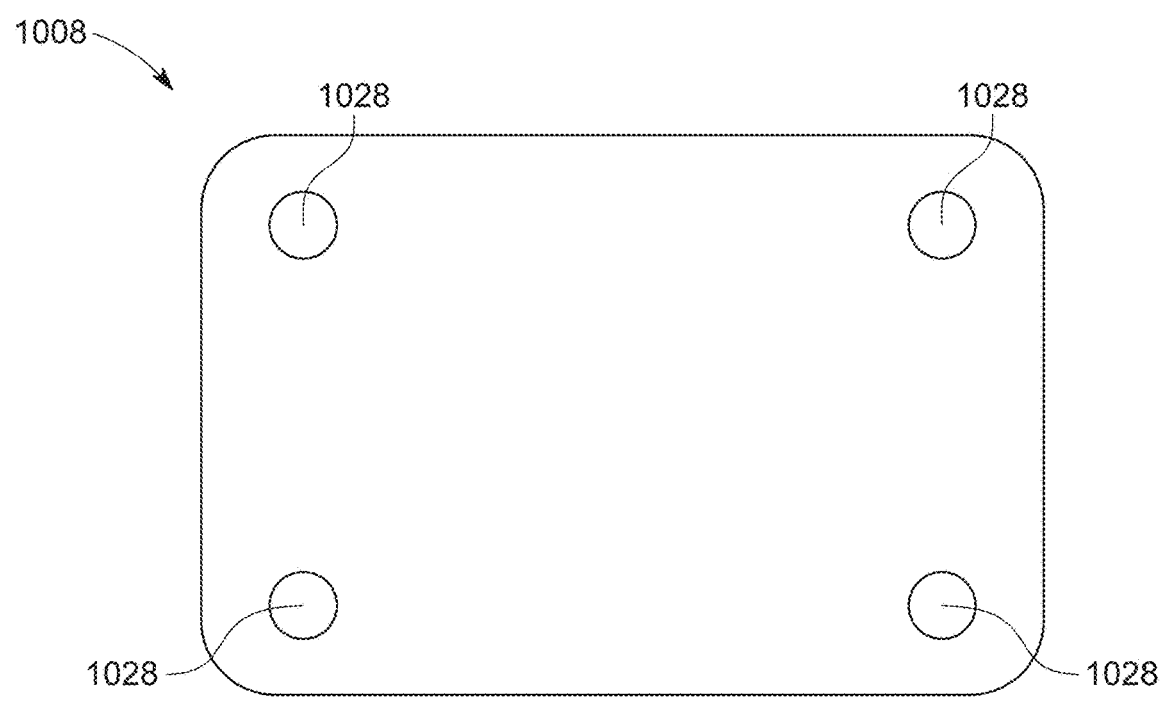
FIG. 18 is a rear view of a substrate.
Figure 19:
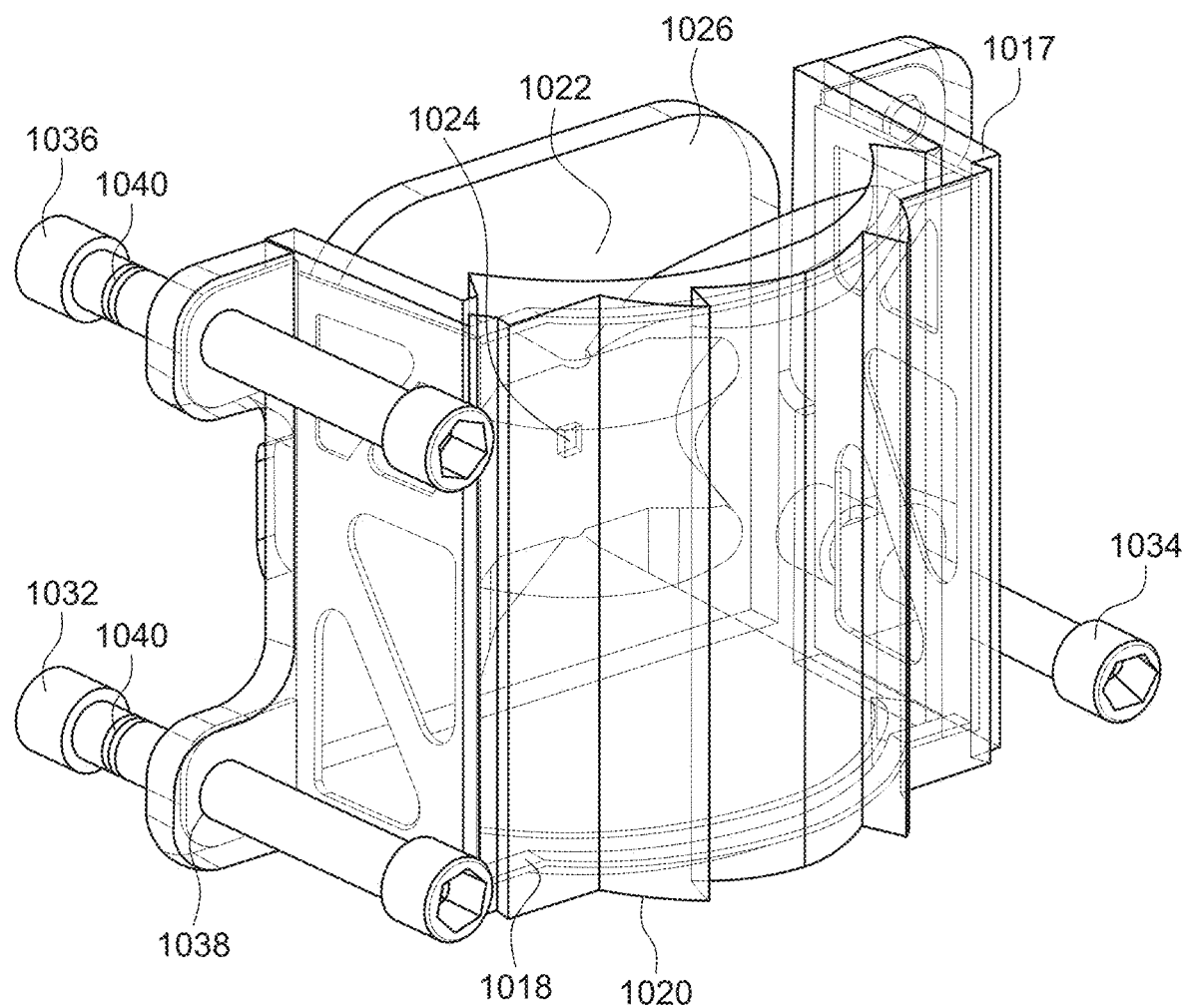
FIG. 19 is a front perspective view of FIG. 15 with the skirt and substrate removed.

FIGS. 14-19 illustrate embodiments of a lamp having a dual axis adjustment mechanism that allows for adjustment of the lens to prescription requirements both during assembly of the vehicle and after the vehicle has been assembled, without the need for any gap around the lens to allow for movement of the lens. In FIGS. 14, 16 and 19, the dual axis adjustment mechanism is only accessible from the rear of the substrate. In FIGS. 15, 17 and 18, the dual axis adjustment is accessible from both a rear of the substrate and the front of the compliant skirt. Other than accessibility, the embodiments are implanted the same.

FIG. 14 is a front perspective view of a vehicle lamp 1000 having a lens 1002 with a front light exiting surface 1004. A compliant skirt 1006 frames the front light exiting surface 1004 and extends to a substrate 1008, best shown in FIGS. 16, 18 and 19, to gaplessly seal the vehicle lamp. FIG. 15 illustrates a vehicle lamp 1000 in which the compliant skirt 1006 is transparent so that the internal components can be described. FIG. 17 is FIG. 15 with the compliant skirt 1006 and the substrate 1008 removed. The vehicle lamp 1000 also has at least three alignment portions 1010, the at least three alignment portions 1010 extending from three edge positions 1016 of the lens 1002, the alignment portions 1010 extending parallel to the substrate 1008. As illustrated in the figures, there are four alignment portions 1010, one extending from each edge position 1016 of the lens 1002. Although the dual axis adjustment mechanism only uses three alignment portions 1010, the vehicle lamps 1000 are typically made with four, with one being left unused. This allows for the vehicle lamp 1000 with the dual axis adjustment mechanism to be used on the right side or the left side of the vehicle, the three alignment portions 1010 selected for use in the dual axis adjustment mechanism depending on side. Of course, it is contemplated that a vehicle lamp may be made specifically for a right or left side and so only have three alignment portions, all used for the dual axis adjustment mechanism.

If the lens 1002 is made of conventional plastic or glass, the alignment portions 1010 can also be plastic or glass and be integrally formed with and extend from the lens 1002. Due to the rigid nature of the plastic or glass, a flexible material is positioned between the substrate 1008 and the at least three alignment portions 1010. The flexible material assists in allowing for the small changes (+/−4°) in alignment that are necessary with the dual axis adjustment mechanism. If the lens 1002 is, as disclosed with respect to the single-point adjustment embodiments, a unitary molded lens of optical silicone having the front light exiting surface 1004 and an integral reflector 1012 contiguous with the front light exiting surface 1004, an alignment member 1014 of a rigid material can be used with the optical silicone molded over the alignment member 1014. The alignment portions 1010 extend from the alignment member 1014 and are also molded in the optical silicone. The alignment member 1014 can extend along vertical sides or edges 1017 of the lens 1002 as illustrated. The alignment member 1014 when used with the optical silicone is a reinforcing structure molded within the unitary molded lens 1002 to impart structural strength to the optical silicone. The alignment member 1014 when used as a reinforcing structure may also have additional supporting structures 1018 such as along the bottom or top edges 1020 of the lens 1002, so long as the reinforcing structure does not interfere with the front light exiting surface 1004. If the lens 1002 is circular or oval, having a circular or oval lamp face, the alignment member may reinforce the lens by extending around an entire circumference of the lens 1002 or may only extend along arcs on either side of the lens 1002. The compliant skirt would also be round or oval and provide a gapless seal with the lens and substrate.

The vehicle lamp 1000 also has the substrate 1008 positioned at the rear of the lamp opposite the front light exiting surface 1004 to enclose the vehicle lamp 1000 with the compliant skirt 1006 and the front light exiting surface 1004. The substrate 1008 and the lens 1002 define a lamp chamber 1022 between the lens 1002 and the substrate 1008 to house a light source 1024, such as an LED. The light source 1024 can be carried directly on the substrate 1008 or can be carried on an optionally placed circuit board 1026. The substrate 1008 may be a heat sink exposed to ambient atmosphere outside the lamp chamber 1022 such that heat from the light source 1024 is transmitted to the ambient atmosphere.

The lens 1002 has a vertical axis V parallel to a vertical edge 1017 and a horizontal axis H parallel to a bottom or top edge 1020 of the lens, illustrated in FIG. 16, which has the substrate removed to show the internals. The vertical axis V can extend along either vertical edge of the lens 1002 and can be a spaced distance D away from the actual vertical edge 1017 of the lens 1002 as illustrated in FIG. 16. The vertical axis V can also extend directly along the vertical edge 1017 of the lens 1002 as illustrated in FIG. 17. The horizontal axis H can align with a bottom or top edge 1020 of the lens 1002 or can be a spaced distance from the bottom or top edge 1020 of the lens 1002. The same is true if the lens is round or oval, with the vertical edge being the midpoint of the perimeter that is furthest right or left, with the bottom or top edge being the midpoint of the perimeter that is at the top or bottom of the perimeter.

The three alignment portions 1010 extend from the plastic/glass lens or from the alignment member 1014 so that they are parallel to the substrate 1008 but equally spaced from the substrate 1008. The flexible material with the glass/plastic lens is placed between the three alignment portions 1010 and the substrate 1008 and may fully extend between the substrate 1008 and the three alignment portions 1010. The alignment portions 1010 molded over with optical silicone will also have the optical silicone between the alignment portions 1010 and the substrate 1008.

Figure 20:
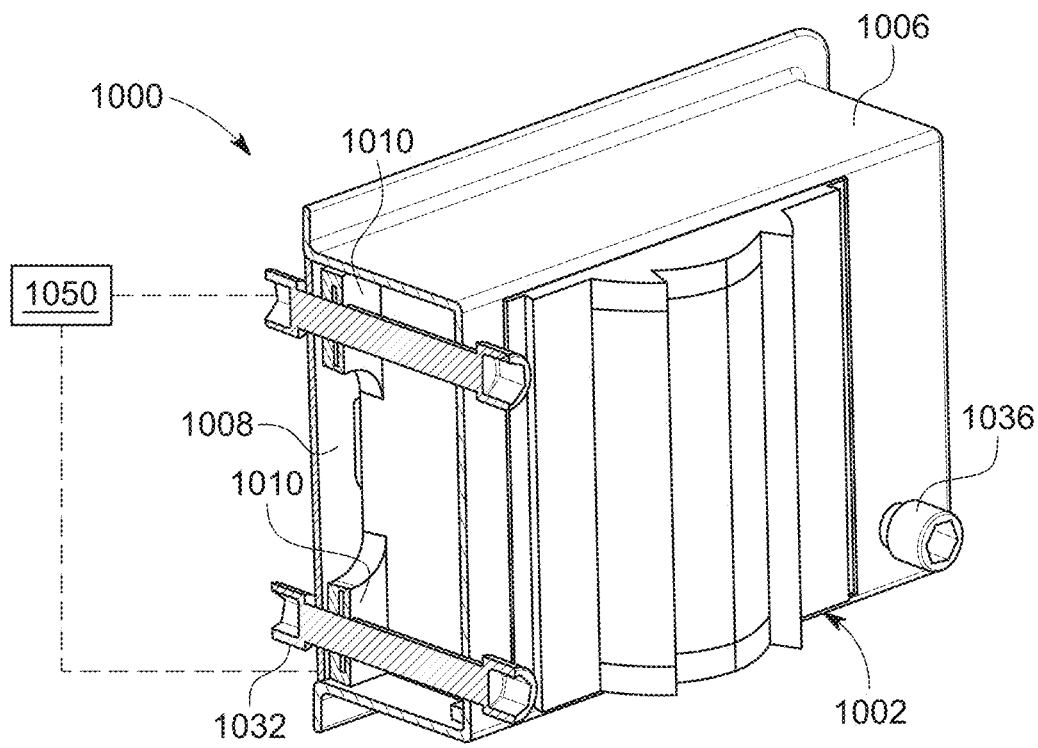
FIG. 20 is a cross-sectional view of FIG. 15 along line 20.
Figure 21:
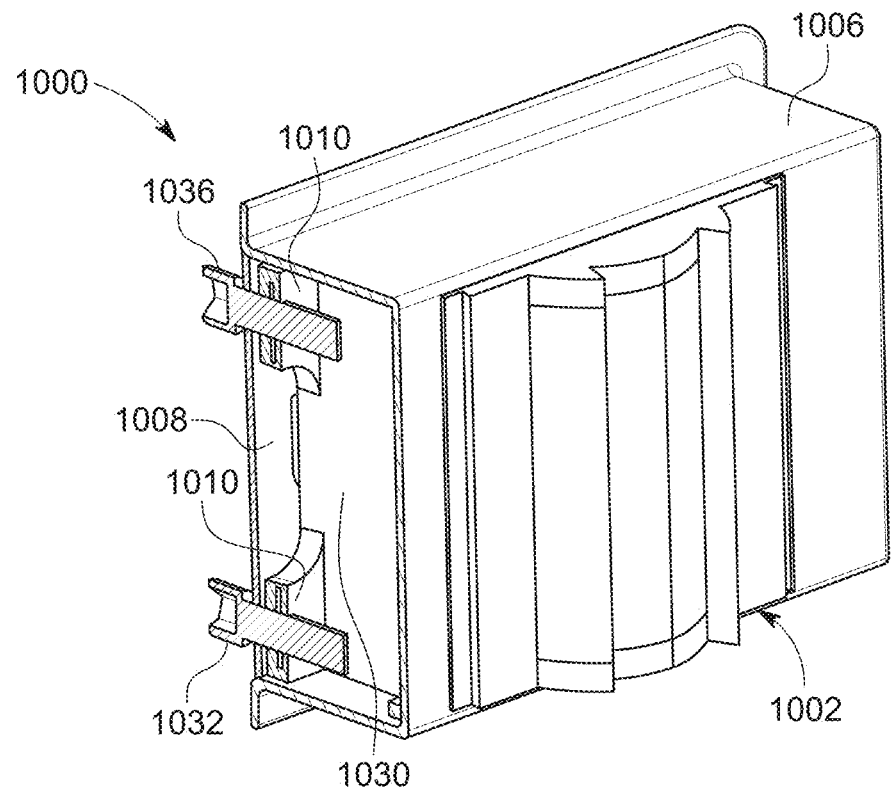
FIG. 21 is a cross-sectional view of FIG. 14 alone line 21.

The substrate 1008, shown from the rear in FIG. 18, can have three apertures 1028 that are aligned with the three alignment portions 1010. As previously noted, the lamps may be made for either side and will have four apertures in the substrate to align with the four alignment portions, while only three of the four are used for adjustment. A dual axis adjustment mechanism 1030 extends through the apertures 1028 in the substrate 1008 and attaches to the respective alignment portion 1010 as seen in FIGS. 15, 20 and 21. The dual axis adjustment mechanism 1030 has three members, each member extending through a respective aperture 1028 in the substrate 1008 and attached to a respectively aligned alignment portion 1010. The three members include: a fixed member 1032 fixedly connected to both the substrate 1008 and its respective one of the three alignment portions 1010 and positioned on both the horizontal axis H and the vertical axis V of the lens 1002. A vertical adjustor 1034 is fixedly attached to its respective second of the three alignment portions 1010 and movable with respect to the substrate 1008, the vertical adjustor 1034 positioned on the horizontal axis H and configured to adjust the lens 1002 with respect to the vertical axis V. A horizontal adjustor 1036 is fixedly attached to its respective third of the three alignment portions 1010 and movable with respect to the substrate 1008, the horizontal adjustor 1036 positioned along the vertical axis V and configured to adjust the lens 1002 with respect to the horizontal axis H.

As mentioned before, the three members (fixed member 1032, vertical adjustor 1034, horizontal adjustor 1036) of the dual axis adjustment mechanism 1030 can extend through the compliant skirt to be accessible from the front of the lamp 1000, as shown in FIG. 20. The three members (fixed member 1032, vertical adjustor 1034, horizontal adjustor 1036) can be fixedly connected to a respective alignment portion 1010. Alternatively, as illustrated in FIG. 21, the alignment portions 1010 can have a respective aperture 1038 through which the three members (fixed member 1032, vertical adjustor 1034, horizontal adjustor 1036) extend. The three members are fixedly attached to the alignment portions through the apertures 1038. The vertical adjustor 1034 and the horizontal adjustor 1036 are movable with respect to the substrate 1008. They can friction fit through the apertures 1028 so that they cannot freely move but can be turned by a human or a tool. The vertical adjustor 1034 and the horizontal adjustor 1036 may be threaded 1040 (with the other having counterpart threads) with the apertures 1028 in the substrate 1008 as shown in FIG. 19. Other means can be used to achieve movement of the alignment portions 1010 by moving the vertical adjuster 1034 and the horizontal adjustor 1036 with respect to the substrate 1008.

Figure 22:
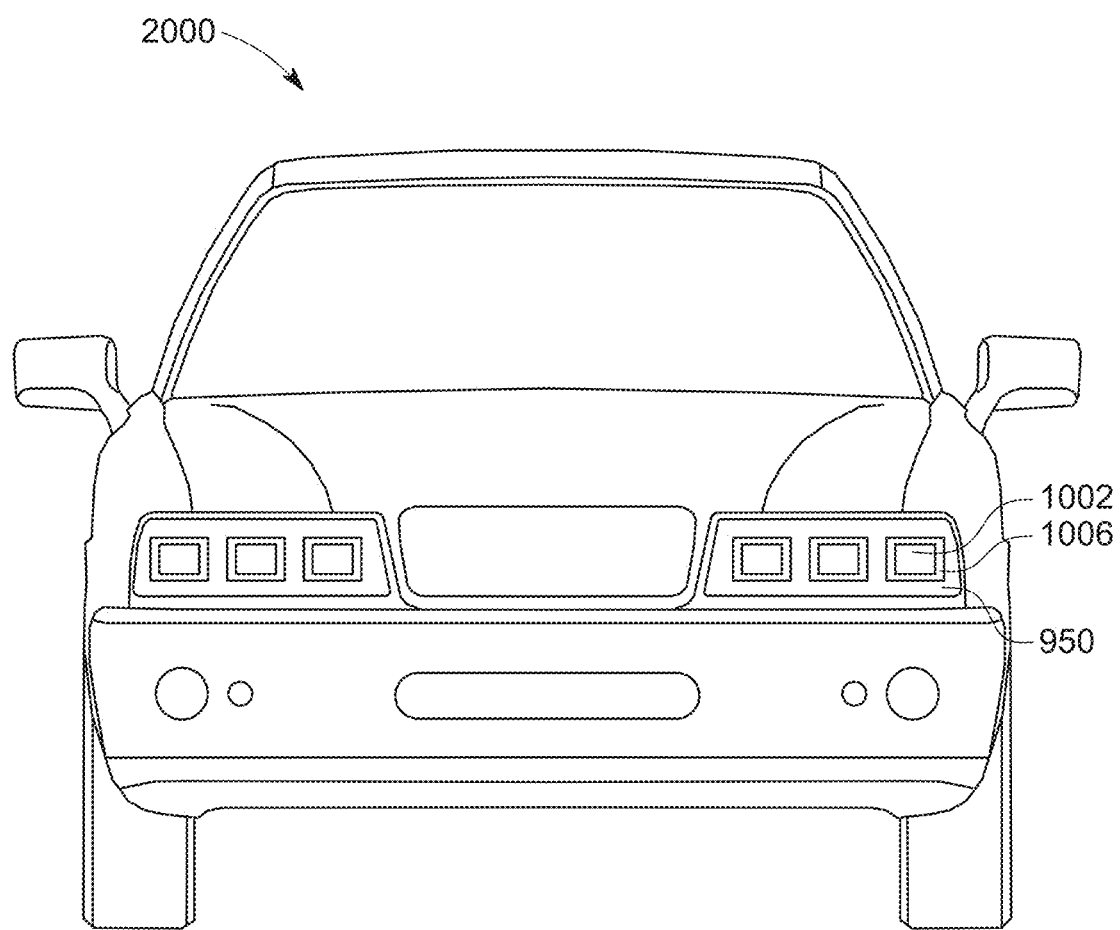
FIG. 22 is a vehicle having the vehicle lamp with the dual axis adjustment mechanism as disclosed herein.

The vehicle lamp 1000 as disclosed herein can be any kind of head lamp or tail lamp. The vehicle lamp 1000 can be mounted to a vehicle structural element configured to bear a load from a vehicle component, the vehicle structural element and the compliant skirt forming a gapless seal. The vehicle structural element can either cover the compliant skirt 1006 so that only the front light exiting surface 1004 of the lens 1002 is showing or can expose the compliant skirt 1006. The vehicle structural element can be an exterior panel, a fender, a bumper, or other vehicle exterior component. FIG. 22 is an illustrative example of a vehicle lamp 1000 as described with respect to FIGS. 14-21 wherein the vehicle structural element 804, 904 is a front fender or bumper 950 of the vehicle 2000. In FIG. 22, the compliant skirt 1006 is exposed to the atmosphere along with the front light exiting surface 1004 of the lens 1002.

Lamps are positioned upon vehicle installation. That is, while lamps are normally pre-adjusted at the supplier factory, vehicle build variations require a final adjustment, at the end of the assembly line. Only those lamps labeled as such are allowed to be field adjusted in order for the headlamp to be fine-tuned for final, in-vehicle aim.

Figure 23A:
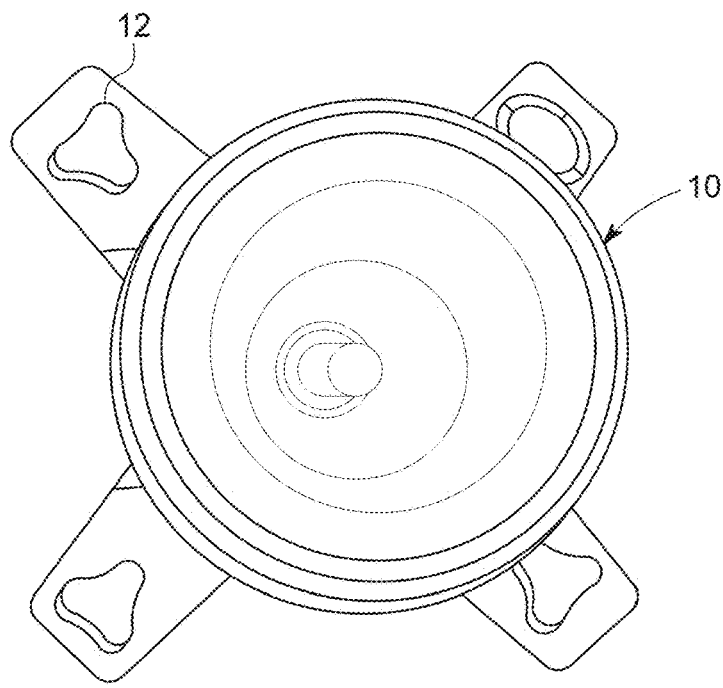
FIGS. 23A and 23B illustrate conventional vehicle lamps with conventional adjustment mechanisms requiring a gap.
Figure 23B:
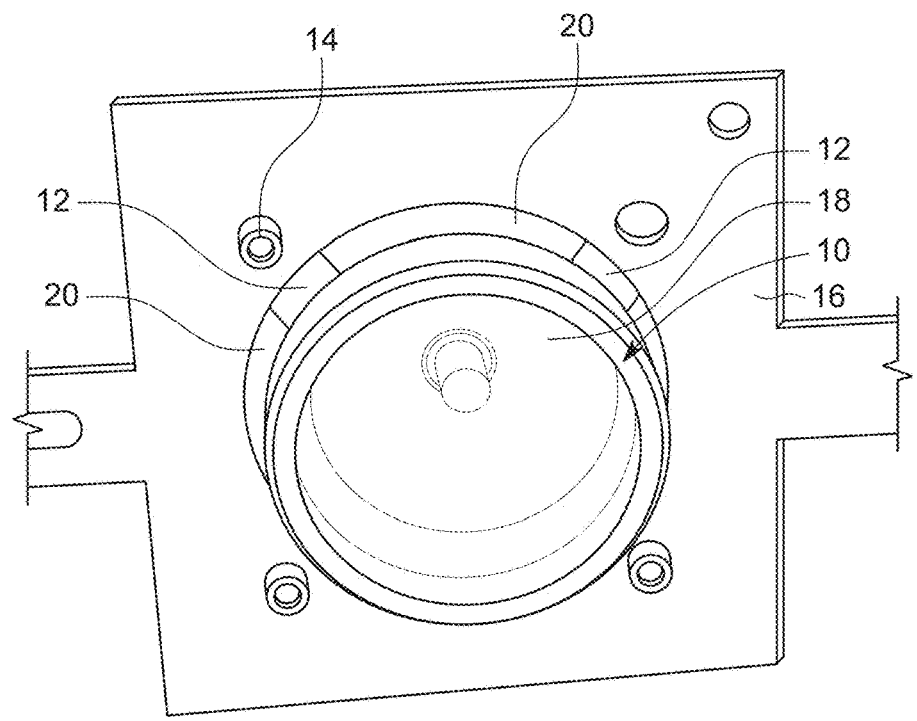

A conventional head lamp 10 is shown in FIGS. 23A and 23B. The alignment attachment portions 12 of the conventional lamp 10 extend from external the lamp chamber. The adjustment mechanisms 14 attach to a surrounding rigid environment 16 that is spaced from the front surface 18 of the lens by a gap 20 that surrounds the entire front surface 18. This is necessary to allow the lamp to freely adjust and pivot. This gap is unsightly and creates a path for dust and debris. The gap also creates a path for wind intrusion, which can contribute to noise generation and negative aerodynamic traits. The lamp and surrounding rigid environment are conventionally placed in a housing so the gap is not seen when looking at the vehicle. This housing is then mounted to the vehicle, typically with some sort of fascia to improve the aesthetics of the housing.

The compliant flexible skirt 1006 of the vehicle lamps 1000 disclosed frames the front light exiting surface 1004 of the lens 1002, the compliant skirt 1006 extending to the substrate 1008, gaplessly enclosing the lamp chamber 1022. The compliant skirt 1006 may be a transparent material or an opaque material. In one aspect, the compliant skirt 1006 is made of silicone which creates a gapless seal with the lens 1002 and is configured to maintain the gapless seal during adjustment with the dual axis adjustment mechanism 1030. Due to this seal, the lamps 1000 disclosed herein do not need a housing that covers the compliant skirt 1006 and the lens 1002. Rather, the compliant skirt 1006 and the lens 1002 may be directly exposed to atmosphere external to the vehicle. When the lens 1002 is silicone, the lens 1002 requires no further coating as the silicone is UV resistant and dent and dirt resistant. This is illustrated in FIG. 22. Because of the tight gapless seal between the compliant skirt 1006, lens 1002 and substrate 1008, there are no gaps, leaving no path for dust and debris. The gapless seal also prevents wind intrusion, which can contribute to noise generation and negative aerodynamic traits.

The lamps 1000 disclosed herein may be utilized with advanced forward lighting systems (AFSs). In AFSs, the lens moves from left to right as the steering wheel is turned. As illustrated in FIG. 20, a stepper motor 1050 may be connected to the vertical adjuster 1034 to dynamically adjust the lens 1002 side to side around the vertical axis. The stepper motor 1050, or another stepper motor, may additionally or alternatively be connected to the horizontal adjuster 1036 and used to dynamically adjust the lens 1002 up and down around the horizontal axis.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle lamp configured to mount directly to a vehicle component, the vehicle lamp comprising:
   a substrate;
   a lens;
   a compliant skirt made of silicone extending from a front perimeter of the lens and extending to the substrate, the compliant skirt configured to gaplessly fit within a vehicle aperture in the vehicle component and to attach the vehicle component with the substrate;

a reinforcing structure configured to provide strength to the vehicle lamp, the reinforcing structure connecting the lens to the substrate; and an adjustment mechanism extending through the reinforcing structure and the substrate and configured to move the lens about one or both of a vertical axis and a horizontal axis.

2. The vehicle lamp according to claim 1, wherein the adjustment mechanism is fixedly connected to the reinforcing structure and movably connected to the substrate.

3. The vehicle lamp according to claim 1, wherein the lens is pivotally connected to the substrate.

4. The vehicle lamp according to claim 1, wherein the lens is silicone and the reinforcing structure is a material that is different from silicone.

5. The vehicle lamp according to claim 1, wherein the substrate carries one or more of a light source, a circuit board and a heat sink.

6. The vehicle lamp according to claim 1, wherein the substrate has an aperture through which the adjustment mechanism extends, the adjustment mechanism threaded with the aperture.

7. The vehicle lamp according to claim 1, wherein the reinforcing structure comprises portions parallel to the substrate, each of the portions having a respective aperture that aligns with a respective aperture in the substrate, the adjustment mechanism comprising:

members, each member extending through the respective aperture of one of the portions and the respective aperture in the substrate.

8. The vehicle lamp according to claim 7, wherein the members include:

a fixed member fixedly connected to both the substrate and the reinforcing structure and positioned on both a horizontal axis and a vertical axis.

9. The vehicle lamp according to claim 7, wherein the members include:

a vertical adjustor fixedly attached to the reinforcing structure and movable with respect to the substrate, the vertical adjustor positioned on a horizontal axis and configured to adjust the lens with respect to a vertical axis.

10. The vehicle lamp according to claim 7, wherein the members include:

a horizontal adjustor fixedly attached to the reinforcing structure and movable with respect to the substrate, the horizontal adjustor positioned along a vertical axis and configured to adjust the lens with respect to a horizontal axis.

11. The vehicle lamp according to claim 1, wherein the compliant skirt is configured to maintain a gapless seal with the vehicle aperture during adjustment with the adjustment mechanism.

12. A vehicle lamp, comprising:

a substrate having a surface on which at least one light source is carried, the substrate having a first aperture;

a total internal reflector made of silicone;

a compliant skirt made of silicone and extending between a front surface of the total internal reflector and the substrate, the compliant skirt configured to gaplessly fit within a vehicle aperture in the vehicle component and to attach the vehicle component with the substrate;

a reinforcing structure configured to provide strength to the silicone, the reinforcing structure connecting the total internal reflector to the substrate and having a second aperture that aligns with the first aperture; and an adjustment mechanism extending through the first aperture and the second aperture, the adjustment mechanism fixedly attached to the reinforcing structure and movably attached to the substrate, wherein movement of the adjustment mechanism moves the total internal reflector about an axis.

13. The vehicle lamp according to claim 12, wherein the compliant skirt frames a front surface of the total internal reflector and extends to the substrate to enclose the total internal reflector, the reinforcing structure and the at least one light source.

14. The vehicle lamp according to claim 12, wherein the compliant skirt frames a front surface of the total internal reflector, the front surface forming a circular or oval lamp face, the reinforcing structure extending along a circumference of the circular lamp face.

15. The vehicle lamp according to claim 12, wherein the adjustment mechanism is threaded and the first aperture of the substrate has counterpart threads, wherein rotation of the adjustment mechanism moves the total internal reflector.

16. The vehicle lamp according to claim 12, wherein the total internal reflector is pivotally connected to the substrate through the reinforcing structure.

17. The vehicle lamp according to claim 12, wherein the reinforcing structure comprises portions parallel to the substrate, each of the portions having a respective second aperture that aligns with a respective first aperture in the substrate, the adjustment mechanism comprising:

members, each member extending through the respective second aperture of one of the portions and the respective first aperture in the substrate that aligns with the respective second aperture.

18. The vehicle lamp according to claim 17, wherein the members include:

a fixed member fixedly connected to both the substrate and the reinforcing structure and positioned on both a horizontal axis and a vertical axis.

19. The vehicle lamp according to claim 17, wherein the members include:

a vertical adjustor fixedly attached to the reinforcing structure and movable with respect to the substrate, the vertical adjustor positioned on a horizontal axis and configured to adjust the total internal reflector with respect to a vertical axis.

20. The vehicle lamp according to claim 17, wherein the members include:

a horizontal adjustor fixedly attached to the reinforcing structure and movable with respect to the substrate, the horizontal adjustor positioned along a vertical axis and configured to adjust the total internal reflector with respect to a horizontal axis.

\* \* \* \* \*